United States Patent
Niv et al.

(10) Patent No.: US 7,492,512 B2
(45) Date of Patent: Feb. 17, 2009

(54) WIDE FIELD-OF-VIEW BINOCULAR DEVICE, SYSTEM AND KIT

(75) Inventors: Yehuda Niv, Nes Ziona (IL); Uzia Nivon, Moshav Kidron (IL); Tal Cohen, Herzlia (IL)

(73) Assignee: Mirage International Ltd., Petach-Tikva (IL)

( * ) Notice: Subject to any disclaimer, the term of this patent is extended or adjusted under 35 U.S.C. 154(b) by 325 days.

(21) Appl. No.: 11/017,920

(22) Filed: Dec. 22, 2004

(65) Prior Publication Data

US 2006/0018014 A1 Jan. 26, 2006

Related U.S. Application Data

(63) Continuation-in-part of application No. 10/896,865, filed on Jul. 23, 2004.

(60) Provisional application No. 60/632,303, filed on Dec. 2, 2004.

(51) Int. Cl.
*G02B 23/00* (2006.01)
*G02B 27/14* (2006.01)

(52) U.S. Cl. .................. 359/407; 359/482; 359/630

(58) Field of Classification Search ......... 359/407–420, 359/480–482, 577–590, 618–630
See application file for complete search history.

(56) References Cited

U.S. PATENT DOCUMENTS

| | | | |
|---|---|---|---|
| 4,410,237 A | 10/1983 | Veldkamp | |
| 4,441,974 A | 4/1984 | Nishikawa et al. | |
| 4,711,512 A | 12/1987 | Upatnieks ............... | 345/7 |
| 4,805,988 A | 2/1989 | Dones ................... | 359/471 |
| 4,931,158 A | 6/1990 | Bunshah et al. | |
| 5,082,629 A | 1/1992 | Burgess et al. | |
| 5,224,198 A | 6/1993 | Jachimowicz et al. | |
| 5,237,451 A | 8/1993 | Saxe | |
| 5,441,570 A | 8/1995 | Hwang | |
| 5,469,185 A * | 11/1995 | Lebby et al. ............ | 345/8 |
| 5,503,875 A | 4/1996 | Imai et al. | |
| 5,619,373 A * | 4/1997 | Meyerhofer et al. ....... | 359/482 |
| 5,682,255 A | 10/1997 | Friesem et al. | |
| 5,693,197 A | 12/1997 | Lal et al. | |

(Continued)

FOREIGN PATENT DOCUMENTS

EP 1031870 8/2000

(Continued)

OTHER PUBLICATIONS

Anonymous "Graphic CIE L*a*b* Calculator. Try the Color Metric Converter or the RGB Calculator", Applet, ColorEng Inc., Retrieved From the Internet: <URL: http://colorpro.com/info/tools/labcalc.htm>, 4 P., 2007.

(Continued)

*Primary Examiner*—Thong Nguyen

(57) ABSTRACT

A binocular device for transmitting an image into the eyes is provided. The binocular device comprises a first monocular device, for providing one eye with a first asymmetric field-of-view, and a second monocular device for providing another eye with a second asymmetric field-of-view, where the first and second asymmetric field-of-views are mutually complementary to a combined field-of-view, wider than each individual asymmetric field-of-view.

57 Claims, 5 Drawing Sheets

U.S. PATENT DOCUMENTS

| | | | |
|---|---|---|---|
| 5,742,262 A | 4/1998 | Tabata et al. | |
| 5,761,177 A | 6/1998 | Muneyoshi et al. | |
| 5,835,661 A | 11/1998 | Tai et al. | |
| 5,966,223 A | 10/1999 | Friesen et al. | 359/16 |
| 6,008,941 A | 12/1999 | Feldman et al. | |
| 6,197,486 B1 | 3/2001 | Majumdar et al. | |
| 6,207,361 B1 | 3/2001 | Greener et al. | |
| 6,436,619 B1 | 8/2002 | Majumdar et al. | |
| 6,465,140 B1 | 10/2002 | Majumdar et al. | |
| 6,487,012 B1 * | 11/2002 | Khoshnevis et al. | 359/407 |
| 6,492,269 B1 | 12/2002 | Liu et al. | |
| 6,566,033 B1 | 5/2003 | Majumdar et al. | |
| 6,570,172 B2 | 5/2003 | Kim et al. | |
| 6,580,529 B1 | 6/2003 | Amitai et al. | |
| 6,611,385 B2 | 8/2003 | Song | |
| 6,638,409 B1 | 10/2003 | Huang et al. | |
| 6,757,105 B2 | 6/2004 | Niv et al. | 359/569 |
| 6,787,463 B2 | 9/2004 | Mardian et al. | |
| 6,805,490 B2 | 10/2004 | Levola | |
| 6,808,978 B2 | 10/2004 | Kim | |
| 6,822,770 B1 | 11/2004 | Takeyama | |
| 6,833,955 B2 | 12/2004 | Niv | |
| 6,879,443 B2 * | 4/2005 | Spitzer et al. | 359/630 |
| 6,882,479 B2 * | 4/2005 | Song et al. | 359/630 |
| 7,206,107 B2 | 4/2007 | Levola | |
| 2002/0041734 A1 | 4/2002 | Worchesky et al. | |
| 2002/0122015 A1 | 9/2002 | Song et al. | |
| 2002/0158131 A1 | 10/2002 | Dickson et al. | |
| 2003/0030596 A1 | 2/2003 | Park | |
| 2003/0040509 A1 | 2/2003 | Moskowitz | |
| 2003/0067685 A1 | 4/2003 | Niv | |
| 2003/0165017 A1 | 9/2003 | Amitai | |
| 2003/0202247 A1 | 10/2003 | Niv et al. | |
| 2004/0004767 A1 | 1/2004 | Song | |
| 2004/0051957 A1 | 3/2004 | Liang | |
| 2004/0062502 A1 | 4/2004 | Levola | |
| 2004/0174348 A1 | 9/2004 | David | |
| 2005/0201693 A1 | 9/2005 | Korenaga et al. | |
| 2006/0056028 A1 | 3/2006 | Wildnauer | |
| 2006/0126179 A1 | 6/2006 | Levola | |

FOREIGN PATENT DOCUMENTS

| | | | |
|---|---|---|---|
| EP | 1333308 | 8/2003 | |
| EP | 1577872 | 9/2005 | |
| GB | 2021803 | 5/1979 | |
| JP | 04-097201 | 3/1992 | |
| JP | 5-249383 | * | 9/1993 |
| JP | 06-230225 | 8/1994 | |
| JP | 06-250022 | 9/1994 | |
| JP | 2000-056259 | 2/2000 | |
| WO | WO 95/11473 | 4/1995 | |
| WO | WO99/52002 | 10/1999 | |
| WO | WO 01/95027 | 12/2001 | |
| WO | WO 03/032017 | 4/2003 | |
| WO | WO 03/091763 | 11/2003 | |
| WO | WO 2004/109349 | 12/2004 | |
| WO | WO 2007/031991 | 3/2007 | |
| WO | WO 2007/031992 | 3/2007 | |
| WO | WO 2007/052265 | 5/2007 | |
| WO | WO 2007/138576 | 12/2007 | |
| WO | WO 2008/020450 | 2/2008 | |

OTHER PUBLICATIONS

Anonymus "TOPAS®: Thermoplastic Olefin Polymer of Amorphous Structure (COC). Cyclic Olefin Copolymer (COC)", Polyplastics, Retrieved From the Internet: URL:http://www.polyplastics.com/en/product/lines/topas/TOPAS.pdf, p. 1-7, 2008. Fig.3.

Sung et al. "Analog Micro-Optics Fabrication by Use of A Binary Phase Grating Mask", Micromachining Technology for Micro-Optics and Nano-Optics II, Proceedings of the SPIE, 5347(1): 62-70, 2004.

Thirstrup et al. "Diffractive Optical Coupling Element for Surface Plasmon Resonance Sensors", Sensors and Actuators B, 100(3): 298-308, 2004. p. 300-302, Figs.2b, 2c.

Shechter et al. "Compact Beam Expander With Linear Gratings", Dept. of Physics of Complex Systems, Weizman Institute of Science,: 1-24.

Eriksson et al. "Highly Directional Grating Outcouplers with Tailorable Radiation Characterisitics", IEEE Journal of Quantum Electronics, 32(6): 1038-1047, 1996. p. 1038, col. 2, Par. 2, Fig. 3,6,7.

Wiesmann et al. "Apodized Surface-Corrugatd gratingss with Varying Duty Cycles", IEEE Photonics Technology Letters, 12(6): 639-641, 2000. p. 640-641, fig. 1,2.

"NanoPrism Technology", Online web.archive.org/web/20050811031919/www.mirageinnovtions.com/main_technology.htm. Abstract.

* cited by examiner

WIDE FIELD-OF-VIEW BINOCULAR DEVICE, SYSTEM AND KIT

This is a continuation-in-part of U.S. patent application Ser. No. 10/896,865, filed Jul. 23, 2004. This application also claims the benefit of priority from U.S. Provisional Patent Application No. 60/632,303, filed Dec. 2, 2004.

FIELD AND BACKGROUND OF THE INVENTION

The present invention relates to a device, system and kit, and, more particularly, to a binocular device, system and kit having a wide field-of-view which is capable of providing monochrome or multicolor images.

Miniaturization of electronic devices has always been a continuing objective in the field of electronics. Electronic devices are often equipped with some form of a display, which is visible to a user. As these devices reduce in size, there is an increase need for manufacturing compact displays, which are compatible with small size electronic devices. Besides having small dimensions, such displays should not sacrifice image quality, and be available at low cost. By definition the above characteristics are conflicting and many attempts have been made to provide some balanced solution.

An electronic display may provide a real image, the size of which is determined by the physical size of the display device, or a virtual image, the size of which may extend the dimensions of the display device.

A real image is defined as an image, projected on or displayed by a viewing surface positioned at the location of the image, and observed by an unaided human eye (to the extent that the viewer does not require corrective glasses). Examples of real image displays include a cathode ray tube (CRT), a liquid crystal display (LCD), an organic light emitting diode array (OLED), or any screen-projected displays. A real image could be viewed normally from a distance of about at least 25 cm, the minimal distance at which the human eye can utilize focus onto an object. Unless a person is long-sighted, he may not be able to view a sharp image at a closer distance.

Typically, desktop computer systems and workplace computing equipment utilize CRT display screens to display images for a user. The CRT displays are heavy, bulky and not easily miniaturized. For a laptop, a notebook, or a palm computer, flat-panel display is typically used. The flat-panel display: may use LCD technology implemented as passive matrix or active matrix panel. The passive matrix LCD panel consists of a grid of horizontal and vertical wires. Each intersection of the grid constitutes a single pixel, and controls an LCD element. The LCD element either allows light through or blocks the light. The active matrix panel uses a transistor to control each pixel, and is more expensive.

An OLED flat panel display is an array of light emitting diodes, made of organic polymeric materials. Existing OLED flat panel displays are based on both passive and active configurations. Unlike the LCD display, which controls light transmission or reflection, an OLED display emits light, the intensity of which is controlled by the electrical bias applied thereto. Flat-panels are also used for miniature image display systems because of their compactness and energy efficiency compared to the CRT displays. Small size real image displays have a relatively small surface area on which to present a real image, thus have limited capability for providing sufficient information to the user. In other words, because of the limited resolution of the human eye, the amount of details resolved from a small size real image might be insufficient.

By contrast to a real image, a virtual image is defined as an image, which is not projected onto or emitted from a viewing surface, and no light ray connects the image and an observer. A virtual image can only be seen through an optic element, for example a typical virtual image can be obtained from an object placed in front of a converging lens, between the lens and its focal point. Light rays, which are reflected from an individual point on the object, diverge when passing through the lens, thus no two rays share two endpoints. An observer, viewing from the other side of the lens would perceive an image, which is located behind the object, hence enlarged. A virtual image of an object, positioned at they focal plane of a lens, is said to be projected to infinity. A virtual image display system, which includes a miniature display panel and a lens, can enable viewing of a small size, but high content display, from a distance much smaller than 25 cm. Such a display system can provide a viewing capability which is equivalent to a high content, large size real image display system, viewed from much larger distance.

Conventional virtual image displays are known to have many shortcomings. For example, such displays have suffered from being too heavy for comfortable use, as well as too large so as to be obtrusive, distracting and even disorienting. These defects stem from, inter alia, the incorporation of relatively large optics systems within the mounting structures, as well as physical designs which fail to adequately take into account important factors as size, shape, weight, etc.

Recently, holographic optical elements have been used in portable virtual image displays, holographic optical elements serve as an imaging lens and a combiner where a two-dimensional, quasi-monochromatic display is imaged to infinity and reflected into the eye of an observer. A common problem to all types of holographic optical elements is their relatively high chromatic dispersion. This is a major drawback in applications where the light source is not purely monochromatic. Another drawback of some of these displays is the lack of coherence between the geometry of the image and the geometry of the holographic optical element, which causes aberrations in the image array that decrease the image quality.

New designs, which typically deal with a single holographic optical element, compensate for the geometric and chromatic aberrations by using non-spherical waves rather than simple spherical waves for recording; however, they do not overcome the chromatic dispersion problem. Moreover, with these designs, the overall optical systems are usually very complicated and difficult to manufacture. Furthermore, the field-of-view-resulting from these designs is usually very small.

U.S. Pat. No. 4,711,512 to Upatnieks, the contents of which are hereby incorporated by reference, describes a diffractive planar optics head-up display configured to transmit collimated light wavefronts of an image, as well as to allow light rays coming through the aircraft windscreen to pass and be viewed by the pilot. The light wavefronts enter an elongated optical element located within the aircraft cockpit through a first diffractive element, are diffracted into total internal reflection within the optical element, and are diffracted out of the optical element by means of a second diffractive element into the direction of the pilot's eye while retaining the collimation. Upatnieks, however, does not teach how the display could transmit a wide field-of-view, or tackle a broad spectrum of wavelengths (for providing color images).

U.S. Pat. No. 5,966,223 to Friesem et al., the contents of which are hereby incorporated by reference describes a holographic optical device similar to that of Upatnieks, with the additional aspect that the first diffractive optical element acts further as the collimating element that collimates the waves emitted by each data point in a display source and corrects for field aberrations over the entire field-of-view. The field-of-view discussed is ±6°, and there is a further discussion of low chromatic sensitivity over wavelength shift of $\Delta\lambda_c$ of ±2 nm around a center wavelength $\lambda_c$ of 632.8 nm. However, the diffractive collimating element of Friesem et al. is known to narrow spectral response, and the low chromatic sensitivity at spectral range of ±2 nm becomes an unacceptable sensitivity at ±20 nm or ±70 nm.

U.S. Pat. No. 6,757,105 to Niv et al., the contents of which are hereby incorporated by reference, provides a diffractive optical element for optimizing a field-of-view for a multicolor spectrum. The optical element includes a light-transmissive substrate and a linear, grating formed therein. Niv et al. teach how to select the pitch of the linear grating and the refraction index of the light-transmissive substrate so as to trap a light beam having a predetermined spectrum and characterized by a predetermined field of view to propagate within the light-transmissive substrate via total internal reflection. Niv et al. also disclose an optical device incorporating the aforementioned diffractive optical element for transmitting light in general and images in particular into the eye of the user.

The above prior art virtual image devices, however, provide a single optical channel, hence allowing the scene of interest to be viewed by one eye. It is recognized that the ability of any virtual image devices to transmit an image without distortions inherently depends on whether or not light rays emanating from all points of the image are successfully transmitted to the eye of the user in their original wavelength. Due to the single optical channel employed by presently known devices, the field-of-view which can be achieved without distortions or loss of information is rather limited.

Although attempts have been made to develop binocular viewing systems [see, e.g., U.S. Pat. No. 4,805,988 to Dones and International Patent Application No. WO 01/95027. to Amitai], these systems are rather bulky, heavily rely on relative positioning and/or relative alignment and are generally less than fully satisfactory. For example, in many traditional binocular viewing systems, two different image paths are outputted to the eyes of the user, and it is necessary to substantially align these optical paths with the user's eyes, such that the center of each image falls on the center of the user's field of view. Furthermore, the two images should have exactly same magnification as well as same orientation. Any departure from such alignment can have many undesirable consequences including loss of image quality, as perceived by the user, user eye strain or fatigue and nausea.

There is thus a widely recognized need for, and it would be highly advantageous to have wide field-of-view binocular device, system and kit devoid the above limitations.

SUMMARY OF THE INVENTION

According to one aspect of the present invention there is provided an optical device for transmitting light striking the optical device at a plurality of angles defining a field-of-view, the optical device comprising a light-transmissive substrate formed with at least one input optical element and a plurality of output optical elements; the at least one input optical element being designed and constructed to diffract the light into the light-transmissive substrate in a manner such that different portions of the light, corresponding to different portions of the field-of-view, propagate in different directions within the light-transmissive substrate; and the plurality of output optical elements being designed and constructed to complementarily diffract the different portions of the light out of the light-transmissive substrate, thereby to substantially preserve the field-of-view.

According to further features in preferred embodiments of the invention described below, each of the at least one input optical element and the plurality of output optical elements is independently a linear diffraction grating.

According to still further features in the described preferred embodiments the plurality of output optical elements comprise a first output optical element diffracting a first portion of the field-of-view, and a second output optical element, diffracting a second portion of the field-of-view.

According to still further features in the described preferred embodiments the linear diffraction grating of the at least one input optical element, the linear diffraction grating of the first output optical element and the linear diffraction grating of the second output optical element are designed and constructed such that each light ray, being in the predetermined overlap, bifurcates within the device and exits the light-transmissive substrate in a form of two substantially parallel light rays.

According to still further features in the described preferred embodiments the light has a plurality of wavelengths defining a spectrum and further wherein different portions of the spectrum are complementarily diffracted out of the light-transmissive substrate by the plurality of output optical elements.

According to still further features in the described preferred embodiments the light has a plurality of wavelengths, respectively corresponding to a plurality of wavelength-dependent field-of-views, and further wherein the light-transmissive substrate, the at least one input optical element and the plurality of output optical elements are designed and constructed so as to maximize an overlap among the plurality of wavelength-dependent field-of-views.

According to still further features in the described preferred embodiments the plurality of output optical elements comprise a first output optical element and a second output optical element.

According to still further features in the described preferred embodiments the spectrum has a first portion and a second portion, each of the first and the second portions of the spectrum being diffracted out of the light-transmissive substrate by at least one of the first and the second output optical elements.

According to still further features in the described preferred embodiments the light-transmissive substrate, the at least one input optical element, the first output optical element and the second output optical element are designed and constructed such that when the first and the second portions of the spectrum strike the optical device at an angle within a first predetermined range, the first portion of the spectrum is diffracted out of the light-transmissive substrate by the first output optical element, and the second portion of the spectrum is diffracted out of the light-transmissive substrate by the second output optical element.

According to still further features in the described preferred embodiments the light-transmissive substrate, the at least one input optical element, the first output optical element and the second output optical element are designed and constructed such that: when the first portion of the spectrum strike the optical device at an angle within a first predetermined range, the first, portion of the spectrum is diffracted out of the light-transmissive substrate by the first output optical element; and when the first portion of the spectrum strike the optical device at an angle within a second first predetermined range, the first portion of the spectrum is diffracted out of the light-transmissive substrate by the second output optical element.

According to another aspect of the present invention there is provided a binocular device for transmitting an image into a first eye and a second eye of a user, the binocular device comprising: an input optical element, formed in a light-transmissive substrate and capable of diffracting the image into the light-transmissive substrate; a first output optical element, formed in the light-transmissive substrate and capable of diffracting a first portion of the image out of the light-transmissive substrate into the first eye; and a second output optical element, formed in the light-transmissive substrate and capable of diffracting a second portion of the image out of the light-transmissive substrate into the second eye.

According to further features in preferred embodiments of the invention described below, the linear diffraction grating of the input optical element, the linear diffraction grating of the first output optical element and the linear diffraction grating of the second output optical element are designed and constructed such that each light ray, emitted by or reflected from the predetermined overlap, bifurcates within the device and exits the light-transmissive substrate in a form of two substantially parallel light rays, respectively propagating into the first and the second eyes.

According to still further features in the described preferred embodiments the image is a multicolor image characterized by a spectrum having a first portion and a second portion, each of the first and the second portions of the spectrum being diffracted out of the light-transmissive substrate by at least one of the first and the second output optical elements.

According to still further features in the described preferred embodiments the first portion of the spectrum of the first portion of the image is diffracted out of the light-transmissive substrate by the first output optical element, and the first portion of the spectrum of the second portion of the image is diffracted out of the light-transmissive substrate by the second output optical element.

According to still further features in the described preferred embodiments the first portion of the spectrum of the first portion of the image is diffracted out of the light-transmissive substrate by the first output optical element, and the second portion of the spectrum of the first portion of the image is diffracted out of the light-transmissive substrate by the second output optical element.

According to still further features in the described preferred embodiments the image is a multicolor image having a plurality of wavelengths, respectively corresponding to a plurality of wavelength-dependent portions of the image, and further wherein the light-transmissive substrate, the at least one input optical element and the plurality of output optical elements are designed and constructed so as to maximize an overlap among the plurality of wavelength-dependent portions of the image.

According to still further features in the described preferred embodiments the linear diffraction grating of the at least one input optical element, the linear diffraction grating of the first output optical element and the linear diffraction grating of the second output optical element, have substantially identical periods.

According to still further features in the described preferred embodiments the linear diffraction grating of the at least one input optical element, the linear diffraction grating of the first output optical element and the linear diffraction grating of the second output optical element, are substantially parallel.

According to yet another aspect of the present invention there is provided a binocular device for transmitting an image into a first eye and a second eye of a user, the binocular device comprising a first monocular device for providing the first eye with a first asymmetric field-of-view and a second monocular device for providing the second eye with a second asymmetric field-of-view, the first and second asymmetric field-of-views being mutually complementary to a combined field-of-view.

According to an additional aspect of the present invention there is provided a system for providing an image to a user, comprising a binocular device for transmitting an image into a first eye and a second eye of the user, and an image generating device for providing the binocular device with the image; wherein the binocular device comprises a first monocular device for providing the first eye with a first asymmetric field-of-view and a second monocular device for providing the second eye with a second-asymmetric field-of-view, the first and second asymmetric field-of-views being mutually complementary to a combined field-of-view.

According to still further features in the described preferred embodiments the system further comprises a wearable device being connected to the binocular device.

According to still further features in the described preferred embodiments the system further comprising a vision correction device, integrated with or mounted on the binocular device.

According to still an additional aspect of the present invention there is provided a communication kit, comprising a communication device, for providing a stream of imagery data; an image generating device for receiving the stream of imagery data and generating an image therefrom; and a binocular device for transmitting the image into a first eye and a second eye of the user; wherein the binocular device comprises a first monocular device for providing the first eye with a first asymmetric field-of-view and a second monocular device for providing the second eye with a second asymmetric field-of-view, the first and second asymmetric field-of-views being mutually complementary to a combined field-of-view.

According to further features in preferred embodiments of the invention described below, the bit is portable.

According to still further features in the described preferred embodiments the communication device is selected from the group consisting of a cellular telephone, a personal digital assistant and a portable computer.

According to a further aspect of the present invention there is provided a method of transmitting light striking light-transmissive substrate at a plurality of angles defining a field-of-view, the method comprising: (a) diffracting the light into the light-transmissive substrate in a manner such that different portions of the light, corresponding to different portions of the field-of-view, propagate in different directions within the light-transmissive substrate; and (b) complementarily diffracting the different portions of the light out of the light-transmissive substrate, so as to substantially preserve the field-of-view.

According to still another aspect of the present invention there is provided a method of transmitting an image into a first eye and a second eye of a user, the method, comprising: (a) diffracting the image into a light-transmissive substrate; (b) diffracting a first portion of the image out of the light-transmissive substrate into the first eye; and (c) diffracting a second portion of the image out of the light-transmissive substrate into the second eye.

According to yet another aspect of the present invention there is provided a method of transmitting an image into a first eye and a second eye of a user, the method comprising: (a) transmitting a first asymmetric field-of-view to the first eye with; and (b) transmitting a second asymmetric field-of-view to the second eye; the first and second asymmetric field-of-views being mutually complementary to a combined field-of-view.

According to still further features in the described preferred embodiments the method further comprises collimating light constituting the image using a collimator.

According to yet a further aspect of the present invention there is provided a method of viewing an image, comprising (a) generating an image using an image generating device; and (b) viewing the image through a binocular device using a first eye and a second eye, in a manner such that a first asymmetric field-of-view of the image is viewed by the first eye, and a second asymmetric field-of-view of the image is viewed by the second eye, wherein the first and second asymmetric field-of-views are mutually complementary to a combined field-of-view.

The present invention successfully addresses the shortcomings of the presently known configurations by providing methods and optical devices, and, in particular binocular devices, capable of transmitting wide field-of-view images.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
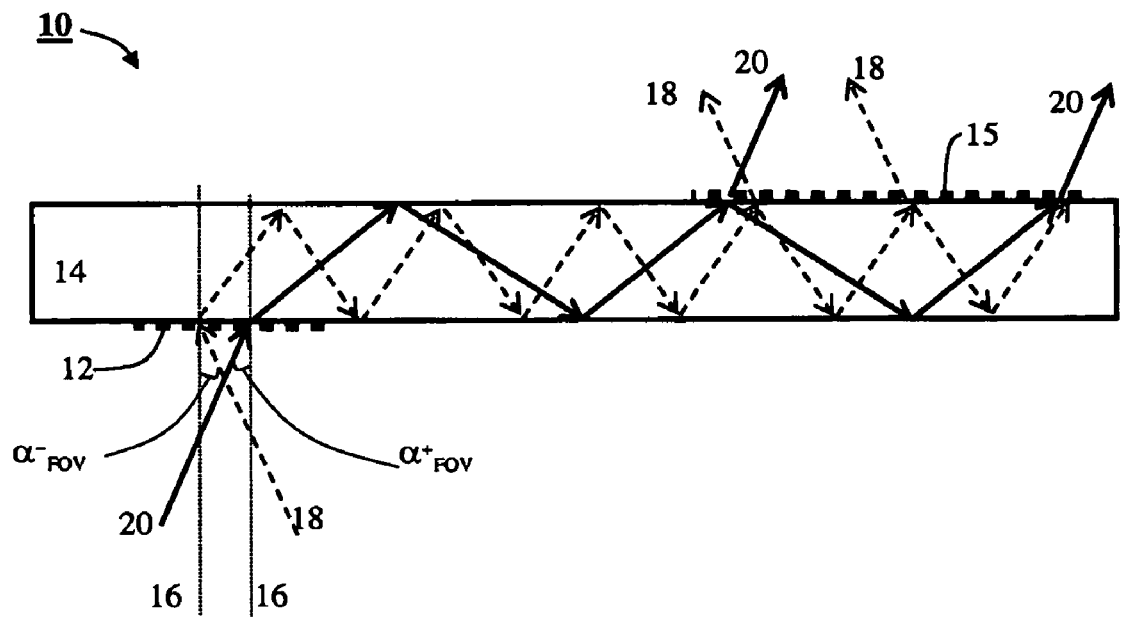
FIG. 1 is a schematic illustration of a prior art monocular device.

The present invention is of methods, devices, a system and a kit which can be used to provide wide field-of-view of monochromatic or multi-chromatic images. Specifically, the present invention can be used in many applications in which virtual images are viewed by a binocular vision, including, without limitation, e.g., eyeglasses, binoculars, head mounted displays, head-up displays, cellular telephones, personal digital assistant, aircraft cockpits and the like.

The principles and operation of the device, system kit and methods according to the present invention may be better understood with reference to the drawings and accompanying descriptions.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

When a ray of light moving within a light-transmissive substrate and striking one of its internal surfaces at an angle $\alpha_1$ as measured from a normal to the surface, it can be either reflected from the surface or refracted out of the surface into the open air in contact with the substrate. The condition according to which the light is reflected or refracted is determined by Snell's law, which is mathematically realized through the following equation:

$$n_A \sin \alpha_2 = n_S \sin \alpha_1 \quad \text{(EQ. 1)}$$

where $n_S$ is the index of refraction of the light-transmissive substrate, $n_A$ is the index of refraction of the medium outside the light transmissive substrate ($n_S > n_A$), and $60_2$ is the angle in which the ray is refracted out, in case of refraction. Similarly to $\alpha_1$, $\alpha_2$ is measured from a normal to the surface. A typical medium outside the light transmissive substrate is air having an index of refraction of about unity.

As used herein, the term "about" refers to ±10%.

As a general rule, the index of refraction of any substrate depends on the specific wavelength $\lambda$ of the light which strikes its surface. Given the impact angle, $\alpha_1$, and the refraction indices, $n_S$ and $n_A$, Equation 1 has a solution for $\alpha_2$ only for $\alpha_1$ which is smaller than arcsine of $n_A/n_S$ often called the critical angle and denoted $\alpha_c$. Hence, for sufficiently large $\alpha_1$ (above the critical angle), no refraction angle $\alpha_2$ satisfies Equation 1 and light energy is trapped within the light-transmissive substrate. In other words, the light is reflected from the internal surface as if it had stroked a mirror. Under these conditions, total internal reflection is said to take place. Since different wavelengths of light (i.e., light of different colors) correspond to different indices of refraction, the condition for total internal reflection depends not only on the angle at which the light strikes the substrate, but also on the wavelength of the light. In other words, an angle which satisfies the total internal reflection condition for one wavelength may not satisfy this condition for a different wavelength.

In planar optics there is a variety of optical elements which are designed to provide an appropriate condition of total internal reflection so that light incident upon a light transmissive substrate will be transmitted within the substrate over a predetermined optical distance. Typically, such optical elements are manufactured as linear gratings which are located on one surface of a light-transmissive substrate at or opposite to the entry point of the light rays. A linear grating is characterized by a so-called grating period or grating pitch, d, which is directly related to the wavelength, $\lambda$, of the light and to the angles $\alpha_I$ and $\alpha_D$, at which a ray of the light incident upon the light-transmissive substrate and diffracted inwards, respectively. The relation is given by the following equation:

$$n_S \sin \alpha_D - n_A \sin \alpha_I = \pm \lambda/d. \quad (EQ. 2)$$

According the known conventions, the sign of $\alpha_I$ and $\alpha_D$ is positive, if the angles are measured clockwise from the normal to the surface, and negative otherwise. The dual sign on the RHS of Equation 2 relates to two possible orders of diffraction, +1 and −1, corresponding to diffractions in opposite directions, say, "diffraction to the right" and "diffraction to the left," respectively.

The available range of incident angles is often referred to in the literature as a "field-of-view." A field-of-view can be expressed either inclusively, in which case its value corresponds to the difference between the minimal and maximal incident angles, or explicitly in which case the field-of-view has a form of a mathematical range or set. Thus, for example, a field-of-view, $\phi$ spanning from a minimal incident angle, $\alpha$, to a maximal incident angle, $\beta$, is expressed inclusively as $\phi = \beta - \alpha$, and exclusively as $\phi = [\alpha, \beta]$. The minimal and maximal incident angles are also referred to as leftmost and rightmost incident angles or clockwise and counterclockwise field-of-view angles, in any combination. The inclusive and exclusive representations of the field-of-view are used herein interchangeably.

The wide spectrum of wavelengths of the visible light and the relatively sensitive dependence of the total internal reflection condition on both angle and wavelength make the known optical elements suitable only for relatively small angles.

The present invention successfully provides methods an apparati for providing a wide field-of-view. For purposes of better understanding the present invention, as illustrated in FIGS. 2-6 of the drawings, reference is first made to the construction and operation of a conventional (i.e., prior art) monocular device as illustrated in FIG. 1.

Hence FIG. 1 illustrates a monocular device 10 including a light-transmissive substrate 14 formed with an input optical element 12 and an output optical element 15, which are typically linear diffraction gratings. Device 10 is designed to transmit light striking substrate 14 at a plurality of angles defining a field-of-view. The field-of-view is illustrated in FIG. 1 by its rightmost light ray 18, striking substrate 14 at an angle $\alpha^-_{FOV}$, and leftmost light ray 20, striking substrate 14 at an angle $\alpha^+_{FOV}$. $\alpha^-_{FOV}$ is measured anticlockwise from a normal 16 to substrate 14, and $\alpha^+_{FOV}$ is measured clockwise from normal 16. Thus, according to the above convention, $\alpha^-_{FOV}$ has a negative value and $\alpha^+_{FOV}$ has a positive value, resulting in a field-of-view of $\phi = \alpha^+_{FOV} + |\alpha^-_{FOV}|$, in inclusive representation.

Input optical element 12 is designed to trap all light rays in the field-of-view within substrate 14. Specifically, when the light rays in the field-of-view impinge on element 12, they are diffracted at a diffraction angle (defined relative to normal 16) which is larger than the critical angle, such that upon striking the other surface of substrate 14, all the light rays of the field-of-view experiences total internal reflection and propagate within substrate 14. The diffraction angles of leftmost ray 20 and rightmost ray 18 are designated in FIG. 1 by $\alpha_D^+$ and $\alpha_D^-$, respectively.

The propagated light, after a few reflections within substrate 14, reaches output optical element 15 which diffracts the light out of substrate 14. As shown in FIG. 1, only a portion of the light energy exits substrate 14. The remnant of each ray is redirected through an angle, which causes it, again, to experience total internal reflection from the other side of substrate 14. After a first reflection, the remnant may re-strike element 15, and upon each such re-strike, an additional part of the light energy exits substrate 14.

For a given spectral range of the light, elements 12 and 15 can be designed solely based on the value of $\alpha^-_{FOV}$ and the value of the shortest wavelength of the spectral range. The optical properties of substrate 14 (e.g., its refraction index) can be selected based on the specific design of the input/output optical elements and the maximal diffraction angle, beyond which the light does not reach output optical element 15.

As can be understood from the geometrical configuration illustrated in FIG. 1, the diffraction angles, $\alpha_D^+$ and $\alpha_D^-$, hence also are typically different. As the diffraction angles depend on the incident angles (see Equation 2, for the case in which element 12 is a linear diffraction grating), the allowed clockwise ($\alpha^+_{FOV}$) and anticlockwise ($\alpha^-_{FOV}$) field-of-view angles, are also different. Thus, monocular device 10 supports transmission of asymmetric field-of-view in which, say, the clockwise field-of-view angle is smaller than the anticlockwise field-of-view angle. For a prior art monocular device, the difference between the absolute values of the clockwise and anticlockwise field-of-view angles can reach more than 70% of the total field-of-view.

While conceiving the present invention it has been hypothesized and while reducing the present invention to practice it has been realized that a wider field-of-view can be transmitted through optical devices, using a configuration in which different portions of the field-of-view are transmitted by different optical elements. Hence, according to a preferred embodiment of the present invention a light-transmissive substrate can be, formed with at least one input optical element and a plurality of output optical elements. The input optical element(s) serve for diffracting the light into the light-transmissive substrate in a manner such that different portions of the light, corresponding to different portions of the field-of-view, propagate within light-transmissive substrate in different directions to thereby reach the output optical elements. The output optical elements complementarily diffract the different portions of the light out of the light-transmissive substrate.

The term "diffracting" as used herein, refers to a change, $\Delta\theta$, in the propagation direction of a wavefront, in either a transmission mode or a reflection mode. In a transmission mode, "diffracting" refers to change in the propagation direction of a wavefront while passing through an optical element in a reflection mode, "diffracting" refers to change in the propagation direction of a wavefront while reflecting off an optical element.

The terms "complementarily" or "complementary," as used herein in conjunction with a particular observable or quantity (e.g., field-of-view, image, spectrum), refer to a combination of two or more overlapping or non-overlapping portions of the observable or quantity so as to provide the information required for substantially reconstructing the original observable or quantity.

Any number of input/output optical elements can be used. Additionally, the number of input optical elements and the number of output optical elements may be different, as two or more-output optical elements may share the same input optical element by optically communicating therewith. The input and output optical element can be formed on a single light-transmissive substrate or a plurality of light-transmissive substrates, as desired. For example, in one embodiment the input and output optical element are linear diffraction gratings, preferably of identical periods, formed on a single light-transmissive substrate, preferably in a parallel orientation.

If several input/output optical elements are formed on the same light-transmissive substrate, as in the above embodiment, they can engage any side of the light-transmissive substrate, in any combination.

One ordinarily skilled in the art would appreciate that this corresponds to any combination of transmissive and reflective optical elements. Thus, for example suppose that there is one input optical element, formed on a first side of the light-transmissive substrate and two output optical elements formed on a second side of light-transmissive substrate. Suppose further that the light impinges on the first side of the light-transmissive substrate and it is desired to diffract the light out of the second side. In this case, the input optical element and the two output optical elements are all transmissive, so as to ensure that entrance of the light through the input optical element, and the exit of the light through the output optical elements. Alternatively, if the input and outfit optical elements are all formed on the first side of the light-transmissive substrate, then the input optical element remain transmissive, so as to ensure the entrance of the light therethrough, while the output optical elements are reflective, so as to reflect the propagating light at an angle which is sufficiently small to couple the light out. In such configuration, light can enter the substrate through the side opposite the input optical element, be diffracted in reflection mode by the input optical element, propagate within the light transmissive substrate in total internal diffraction and be diffracted out by the output optical elements operating in a transmission mode.

Figure 2:
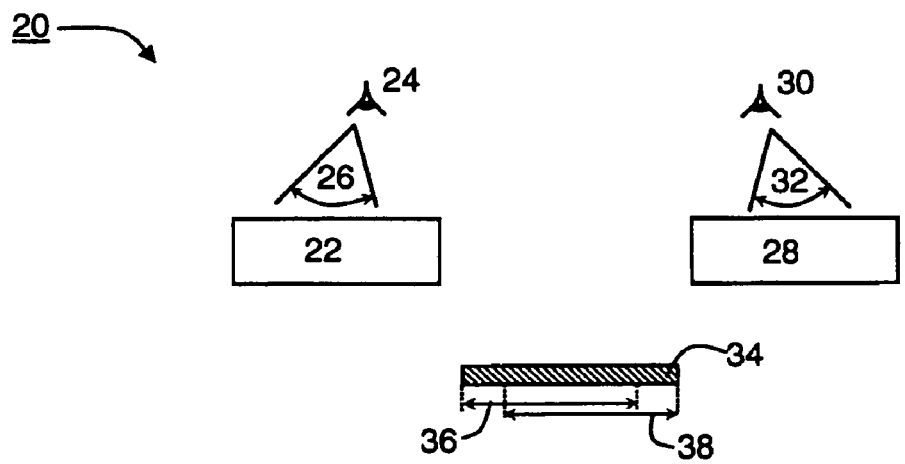
FIG. 2 is a schematic illustration of a binocular device for transmitting an image into a first eye and a second eye of a user, according to a preferred embodiment of the present invention.

Referring now again to the drawings, FIG. 2 schematically illustrates a binocular device 20 for transmitting an image into a first eye and a second eye of a user, according to a preferred embodiment of the present invention.

Hence, device 20 comprises a first monocular device 22, for providing a first eye 24 with a first asymmetric field-of-view 26 and a second monocular device 28 for providing a second eye 30 with a second asymmetric field-of-view 32. First 26 and second 32 asymmetric field-of-views preferably correspond to different portions of an image 34, which different portions are designated in FIG. 2 by numerals 36 and 38.

Generally, the individual field-of-views, hence also the portions of the image arriving to each eye depend on the wavelength of the light. Therefore, it is not intended to limit the scope of the present embodiments to a configuration in which portion 36 is viewed by eye 24 and portion 38 viewed by eye 30. In other words, for different wavelengths, portion 36 is viewed by eye 30 and portion 38 viewed by eye 24. For example, supposing that the image is constituted by a light having three colors red green and blue. As demonstrated in the Examples section that follows, device 20 can be constructed such that eye 24 sees portion 38 for the blue light and portion 36 for the red light, while eye 30 sees portion 36 for the blue light and portion 38 for the red light. In such configuration both eyes see an almost symmetric field-of-view for the green light. Thus, for every color, the two field-of-views compliment each other.

Monocular devices for providing asymmetric field-of-views are known in the art and can be found, for example, in U.S. Pat. No. 6,757,105. Hence, according to a preferred embodiment of the present invention each monocular device comprises an input optical element (e.g., element 12) and an output optical element (e.g., element 15), formed in a light transmissive substrate (e.g., substrate 14), similarly to the configuration of device 10. Both first 22 and second 28 monocular devices may share the input optical element and/or the light-transmissive substrate, as further detailed hereinabove.

The human visual system is known to possess a physiological mechanism capable of inferring a complete image based on several portions thereof, provided sufficient information reaches the retinas. This physiological mechanism operates on monochromatic as well as chromatic information received from the rod cells and cone cells of the retinas. Thus, in a cumulative nature, the two asymmetric field-of-views, reaching each individual eye, form a combined field-of-view perceived by the user, which combined field-of-view is wider than each individual asymmetric field-of-view.

According to a preferred embodiment of the present invention, there is a predetermined overlap between first 26 and second 32 asymmetric field-of-views, which overlap allows the user's visual system to combine portions 36 and 38, thereby to perceive the image, as if it has been fully observed by each individual eye.

For example, as further demonstrated in the Examples section that follows, monocular devices 22 and 28 can be constructed such that the exclusive representations of first 26 and second 32 asymmetric field-of-views are, respectively, $[-\alpha, \beta]$ and $[-\beta, \alpha]$, resulting in a symmetric combined field-of-view of $[-\beta, \beta]$. It will be appreciated that When $\beta >> \alpha > 0$, the combined field-of-view is considerably wider than each of the asymmetric field-of-views.

When the image is a multicolor image having a spectrum of wavelengths, different portions of the spectrum correspond to different, wavelength-dependent, asymmetric field-of-views, which, in different combinations, form different wavelength-dependent combined field-of-views. For example, a red light can correspond to a first red asymmetric field-of-view, and a second red asymmetric field-of-view, which combine to a red combined field-of-view. Similarly, a blue light can correspond to a first blue asymmetric field-of-view, and a second blue asymmetric field-of-view, which combine to a blue combined field-of-view, and so on. Thus, a multicolor configuration is characterized by a plurality of wavelength-dependent combined field-of-views. According to a preferred embodiment of the present invention first 22 and second 28 monocular devices are designed and constructed so as to maximize an overlap between two or more of the wavelength-dependent combined field-of-views.

In terms of spectral coverage, the design of binocular device 20 is preferably as follows: first monocular device 22 provides first eye 24 with, say, a first portion of the spectrum which originates from portion 36 of the image, and a second portion of the spectrum which originates from portion 38 of the image. Second monocular device 28 preferably provides the complementary information, so as to allow the aforementioned physiological mechanism to infer the complete spectrum of the image. Thus, device 28 preferably provides eye 30 with the first portion of the spectrum originating from portion 38, and the second portion of the spectrum originating from portion 36.

Ideally, a multicolor image is a spectrum as a function of wavelength, measured at a plurality of image elements. This ideal input, however, is rarely attainable in practical systems. Therefore, the present embodiment also addresses other forms of imagery information. A large percentage of the visible spectrum (color gamut) can be represented by mixing red, green, and blue colored light in various proportions, while different intensities provide different saturation levels. Sometimes, other colors are used in addition to red, green and blue, in order to increase the color gamut. In other cases, different combinations of colored light are used in order to represent certain partial spectral ranges within the human visible spectrum.

In a different form of color imagery, a wide-spectrum light source is used, with the imagery information provided by the use of color filters. The most common such system is using white light source with cyan, magenta and yellow filters, including a complimentary black filter. The use of these filters could provide representation of spectral range or color gamut similar to the one that uses red, green and blue light sources, while saturation levels are attained through the use of different optical absorptive thickness for these filters, providing the well known "grey levels."

Thus, the multicolored image can be displayed by three or more channels, such as, but not limited to, Red-Green-Blue (RGB) or Cyan-Magenta-Yellow-Black (CMYK) channels. RGB channels are typically used for active display systems (e.g., CRT or OLED) or light shutter systems (e.g., Digital Light Processing™ (DLP™) or LCD illuminated with RGB light sources such as LEDs). CMYK images are typically used for passive display systems (e.g., print). Other forms are also contemplated within the scope of the present invention.

When the multicolor image is formed from a discrete number of colors (e.g., an RGB display), the portions of the spectrum can be discrete values of wavelength. For example, a multicolor image can be provided by an OLED array having red, green and blue organic diodes (or white diodes used with red, green and blue filters) which are viewed by the eye as continues spectrum of colors due to many different combinations of relative proportions and intensities between the wavelengths of light emitted thereby. For such images, the first, and the second portions of the spectrum can correspond to the wavelengths emitted by two of the blue, green and red diodes of the OLED array, for example the blue and red. As further demonstrated in the Example section that follows, device 20 can be constructed such that, say, eye 30 is provided with blue light from portion 36 and red light from portion 38 whereas eye 24 is provided with red light from portion 36 and blue light from portion 38, such that the entire spectral range of the image is transmitted into the two eyes and the physiological mechanism reconstructs the image.

Figure 3A:
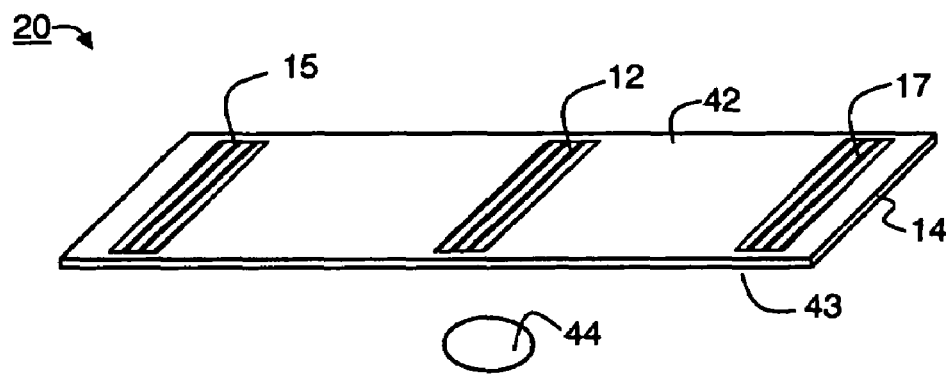
FIGS. 3a-b are schematic illustrations of an isometric view (FIG. 3a) and a side view (FIG. 3b) of an optical device having one input optical element and two output optical elements, hence can be used as the binocular device of FIG. 2, in accordance with preferred embodiments of the present invention.
Figure 3B:
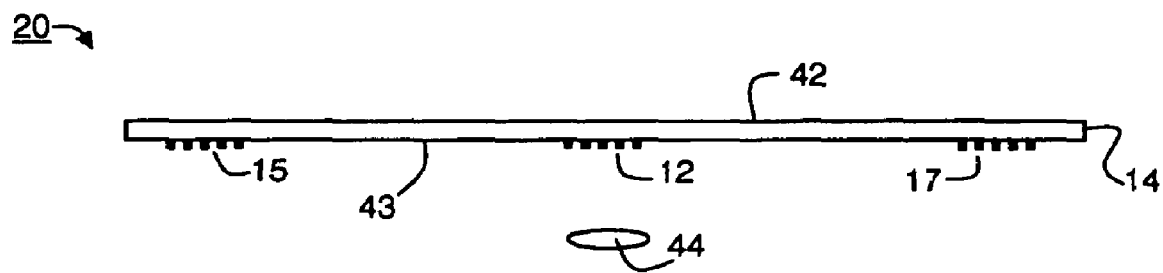

Reference is now made to FIGS. 3a-b which are schematic illustrations of an isometric view (FIG. 3a) and a side view (FIG. 3b) of device 20, in a preferred embodiment in which one input optical element and two output optical elements are employed.

Hence, device 20 comprises input optical element 12 and two output optical elements, referred to herein as first output optical element 15 and second output optical element 17. Referring to FIG. 3b, first 15 and second 17 output optical elements are formed, together with input optical element 12, on a second side 43 of light-transmissive substrate 14. However, as stated, this need not necessarily be the, case, since, for some applications, it may be desired to form the input/output optical elements on any of first 42 or second 43 side of substrate 14, in an appropriate transmissive/reflective combination. According to a preferred embodiment of the present invention first 42 or second 43 side of substrate 14 are substantially parallel. Wavefront propagation within substrate 14, according to various exemplary embodiments of the present invention, is further detailed hereinafter with reference to FIGS. 6a-b.

Element 12 preferably diffracts the incoming light into substrate 14 in a manner such that different portions of the light corresponding to different portions of the field-of-view, propagate in different directions within substrate 14. In the configuration exemplified in FIGS. 3a-b, element 12 diffract one portion of the light leftwards, to thereby reach element 15, and another portion of the light rightwards, to thereby reach element 17. Elements 15 and 17 complementarily diffract the respective portions of the light, or portions thereof, out of substrate 14.

According to a preferred embodiment of the present invention device 20 may further comprise a collimator 44, preferably positioned in front of substrate 14. Collimator 44 serves for collimating the input light, if it is not already collimated, prior to impinging on substrate 14. Any collimating element known in the art may be used as collimator 44, for example a converging lens (spherical or non spherical), an arrangement of lenses, a diffractive optical element and the like. The purpose of the collimating procedure is for improving the imaging ability.

In case of a converging lens, a light ray going through a typical converging lens that is normal to the lens and passes through its center, defines the optical axis. The bundle of rays passing through the lens cluster about this axis and may be well imaged by the lens, for example, if the source of the light is located as the focal plane of the lens, the image constituted by the light is projected to infinity.

Other collimating means, e.g., a diffractive optical element, may also provide imaging functionality, although for such means the optical axis is not well defined. The advantage of a converging lens is due to its symmetry about the optical axis, whereas the advantage of a diffractive optical element is due to its compactness.

In the embodiment in which collimator 44 is a diffractive optical element, it may be spaced apart, carried by or formed in substrate 14. One ordinarily skilled in the art will appreciate that in the presently preferred embodiment collimator 44 may be positioned either on the entry surface of substrate 14, as a transmissive diffractive element or on the opposite surface as a reflective diffractive element.

According to an additional aspect of the present invention there is provided a system 100 for providing an image to a user in a wide field-of-view.

Figure 4:
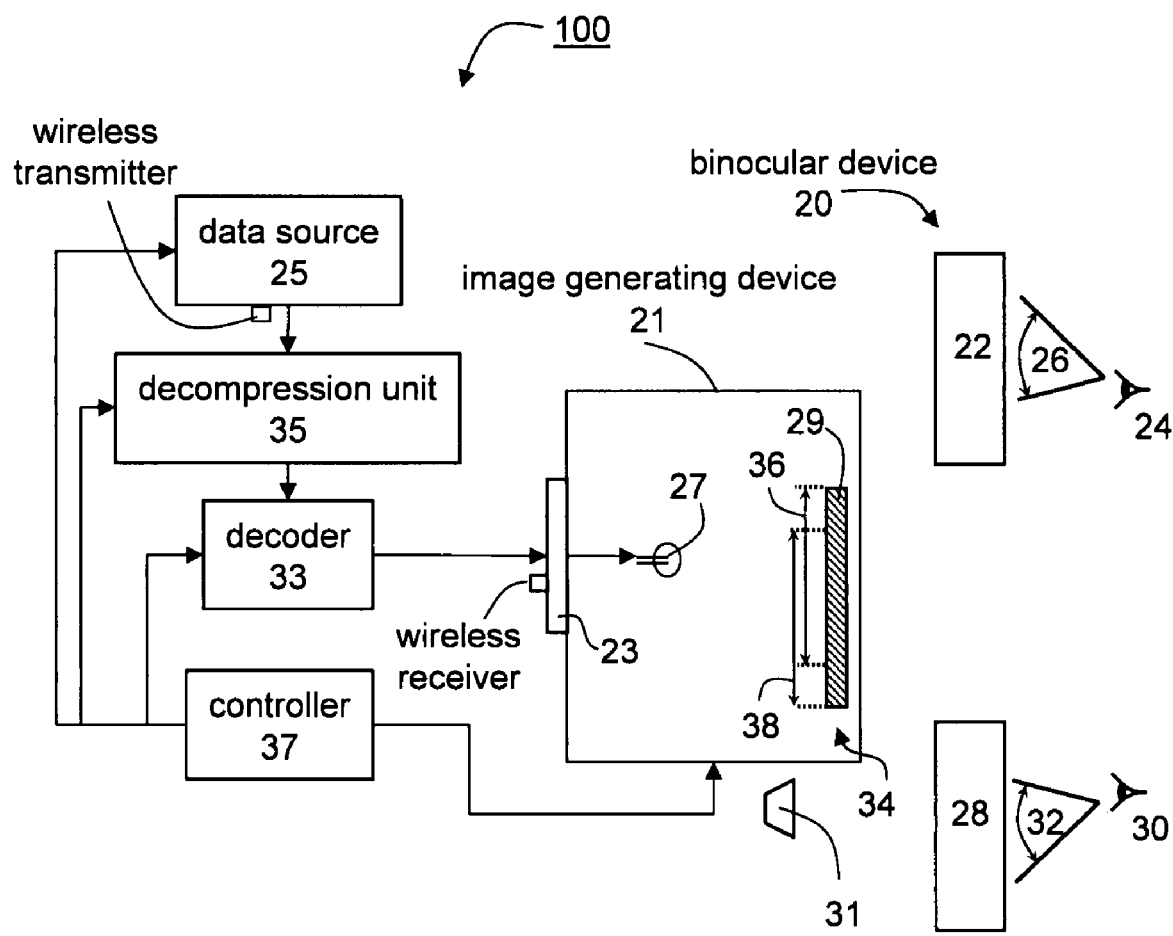
FIG. 4 is a schematic illustration of a system for providing a wide field-of-view image to the user, according to a preferred embodiment of the present invention.

Reference is now made to FIG. 4 which is a schematic illustration of system 100, which, in its simplest configuration, comprises a binocular device for transmitting image 34 into first eye 24 and second eye 30 of the user, and an image generating device 21 for providing the binocular device with image 34. As shown in FIG. 4, the binocular device can be binocular device 20 (see FIGS. 2-3).

Image generating device 21 can be either analog or digital device. An analog image generating device typically comprises a light source 27 and at least one image carrier 29. Representative examples for light source 27 include, without limitation, a lamp (incandescent or fluorescent), one or more LEDs or OLEDs, and the like. Representative examples for image carrier 29 include, without limitation, a miniature slide, a reflective or transparent microfilm and a hologram. The light source can be positioned either in front of the image carrier (to allow reflection of light therefrom) or behind the image carrier (to allow transmission of light therethrough). Optionally and preferably, device 21 comprises a miniature CRT. Miniature CRTs are known in the art and are commercially available, for example, from Kaiser Electronics, a Rockwell Collins business, of San Jose, Calif.

A digital image generating device typically comprises at least one display. The use of certain displays may require, in addition, the use of a light, source. Light sources suitable for a digital image generating device include without limitation a lamp (incandescent or fluorescent), zone or more LEDs (e.g., red, green and blue LEDs) or OLEDs, and the like. Suitable displays include, without limitation, rear-illuminated transmissive or front-illuminated reflective LCD, OLED arrays, Digital Light Processing™ (DLP™) units, miniature plasma display, and the like. A positive display, such as OLED or miniature plasma display, may not require the use of additional light source for illumination. Transparent miniature LCDs are commercially available, for example, from Kopin Corporation, Taunton, Mass. Reflective LCDs are are commercially available, for example, from Brillian Corporation, Tempe, Ariz. Miniature OLED arrays are commercially available, for example, from eMagin Corporation, Hopewell Junction, N.Y. DLP™ units are commercially available, for example, from Texas Instruments DLP™ Products, Plano, Tex. The pixel resolution of the digital miniature displays varies from QVGA (320×240 pixels) or smaller, to WQUXGA (3840×2400 pixels).

System 100 is particularly useful for enlarging a field-of-view of devices having relatively small screens. For example, cellular phones and personal digital assistants (PDAs) are known to have rather small on-board displays. PDAs are also known as Pocket PC, such as the trade name iPAQ™ manufactured by Hewlett-Packard Company, Palo Alto, Calif. The above devices, although capable of storing and downloading a substantial amount of information in a form of single frames or moving images, fail to provide the user with sufficient field-of-view due to their small size displays.

Thus, according to a preferred embodiment of the present invention system 100 comprises a data source 25 which can communicate with device 21 via a data source interface 23. Any type of communication can be established between interface 23 and data source 25, including, without limitation, wired communication, wireless communication, optical communication or any combination thereof. Interface 23 is preferably configured to receive a stream of imagery data (e.g., video, graphics, etc.) from data source 25 and to input the data into device 21. Many types or data sources are contemplated. According to a preferred embodiment of the present invention data source 25 is a communication device, such as, but not limited to, a cellular telephone, a personal digital assistant and a portable computer (laptop). Additional examples for data source 25 include, without limitation, television apparatus, portable television device, satellite receiver, video cassette recorder, digital versatile disc (DVD) player, digital moving picture player (e.g., MP4 player), digital camera, video graphic array (VGA) card, and many medical imaging apparatus, e.g., ultrasound imaging apparatus, digital X-ray apparatus (e.g., for computed topography) and magnetic resonance imaging apparatus.

In addition to the imagery information, data source 25 may generates also audio information. The audio information can be received by interface 23 and provided to the user, using an audio unit 31 (speaker, one or more earphones, etc.).

According to various exemplary embodiments of the present invention, data source 25 provides the stream of data in an encoded and/or compressed form. In these embodiments, system 100 further comprises a decoder 33 and/or a decompression unit 35 for decoding and/or decompressing the stream of data to a format which can be recognized by device. Decoder 33 and decompression unit 35 can be supplied as two separate units or an integrated unit as desired.

System 100 preferably comprises a controller 37 for controlling the functionality of device 21 and, optionally and preferably, the information transfer between data source 25 and device 21. Controller 37 can control any of the display characteristics of device 21, such as, but not limited to, brightness, hue, contrast, pixel resolution and the like. Additionally, controller 37 can transmit signals to data source 25 for controlling its operation. More specifically, controller 37 can activate, deactivate and select the operation mode of data source 25. For example, when data source 25 is a television apparatus or being in communication with a broadcasting station, controller 37 can select the displayed channel; when data source 25 is a DVD or MP4 player, controller 37 can select the track from which the stream of data is read; when audio information is transmitted, controller 37 can control the volume of audio unit 31 and/or data source 25.

System 100 or a portion thereof (e.g., device 20) can be integrated with a wearable device, such as, but not limited to, a helmet or spectacles, to allow the user to view the image, preferably without having to hold binocular device 20 by hand.

Device 20 can also be used in combination with a vision correction device 130, for example, one or more corrective lenses for correcting, e.g., shortsightedness (myopia). In this embodiment, the vision correction device is preferably positioned between the eyes and device 20. According to a preferred embodiment of the present invention system 100 further comprises correction device 130, integrated with or mounted on device 20.

Alternatively system 100 or a portion thereof can be adapted to be mounted on an existing wearable device. For example, in one embodiment device 20 is manufactured as a spectacles clip which can be mounted on the user's spectacles, in another embodiment, device 20 is manufactured as a helmet accessory which can be mounted on a helmet's screen.

Figure 5A:
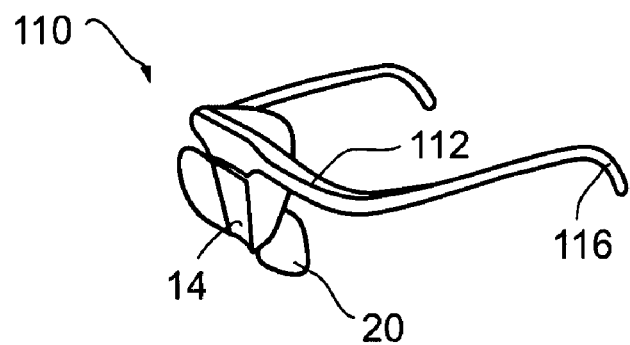
FIG. 5a-c is a schematic illustration of a portion of the system shown in FIG. 4, in a preferred embodiment in which spectacles are used.
Figure 5B:
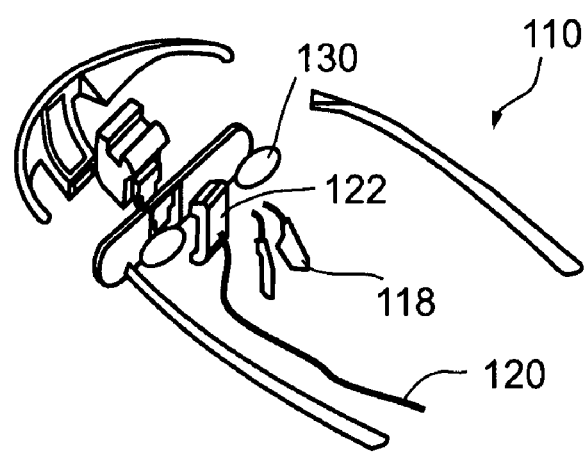
Figure 5C:
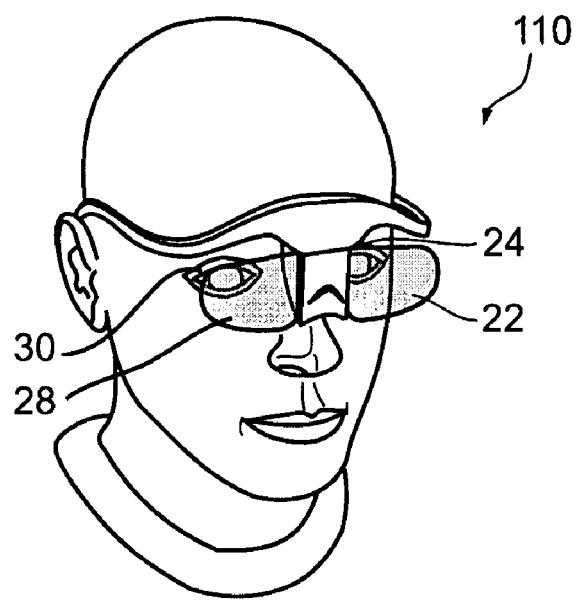

Reference is now made to FIGS. 5a-c which illustrate a wearable device 110 in a preferred embodiment in which spectacles are used. According to the presently preferred embodiment of the invention device 110 comprises a spectacles body 112, having a housing 114, for holding image generating device 21 (not shown, see FIG. 4); a bridge 122, adapted to engage the user's nose; and rearward extending arms 116 adapted to engage the user's ears. Binocular device 20 is preferably mounted between housing 114 and bridge 122, such that when the user wears device 110, first monocular device 22 is placed in front of first eye 24, and a second monocular device 28 is placed in front of second eye 30. According to a preferred embodiment of the present invention device 110 comprises a one or more earphones 118 which can be supplied as separate units or be integrated with arms 116.

Interface 23 (not explicitly shown in FIGS. 5a-c) can be located in housing 114 or any other part of body 112. In embodiments in which decoder 33 is employed, decoder 33 can be mounted on body 112 or supplied as a separate unit as desired. Communication between data source 25 and interface 23 can be, as stated, wireless in which case no physical connection is required between wearable device 110 and data source 25. In embodiments in which the communication is not wireless, suitable communication wires and/or optical fibers 120 are used to connect interface 23 with data source 25 and the other components of system 100.

The present embodiments can also be provided as add-ons to the data source or any other device capable of transmitting imagery data. Additionally, the present embodiments can also be used as a kit which includes the data source, the image generating device, the binocular device and optionally the wearable device. For example, when the data source is a communication device, the present embodiments can be used as a communication kit.

Following is a description of the principles and operations of binocular device 20, according to a preferred embodiment of the present invention. As stated, device 20 preferably comprises two monocular devices, each of which can be formed on a light transmissive substrate.

Figure 6A:
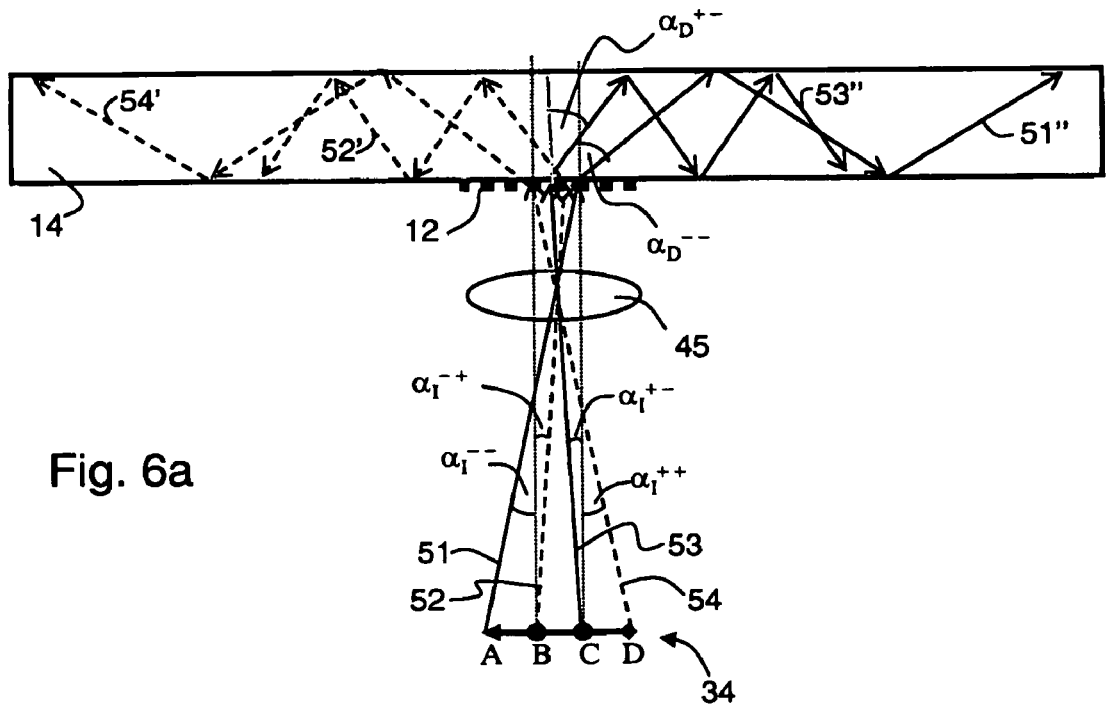
FIGS. 6a-b illustrate wavefront propagation within the device of FIGS. 3a-b, according to a preferred embodiment of the present invention.
Figure 6B:
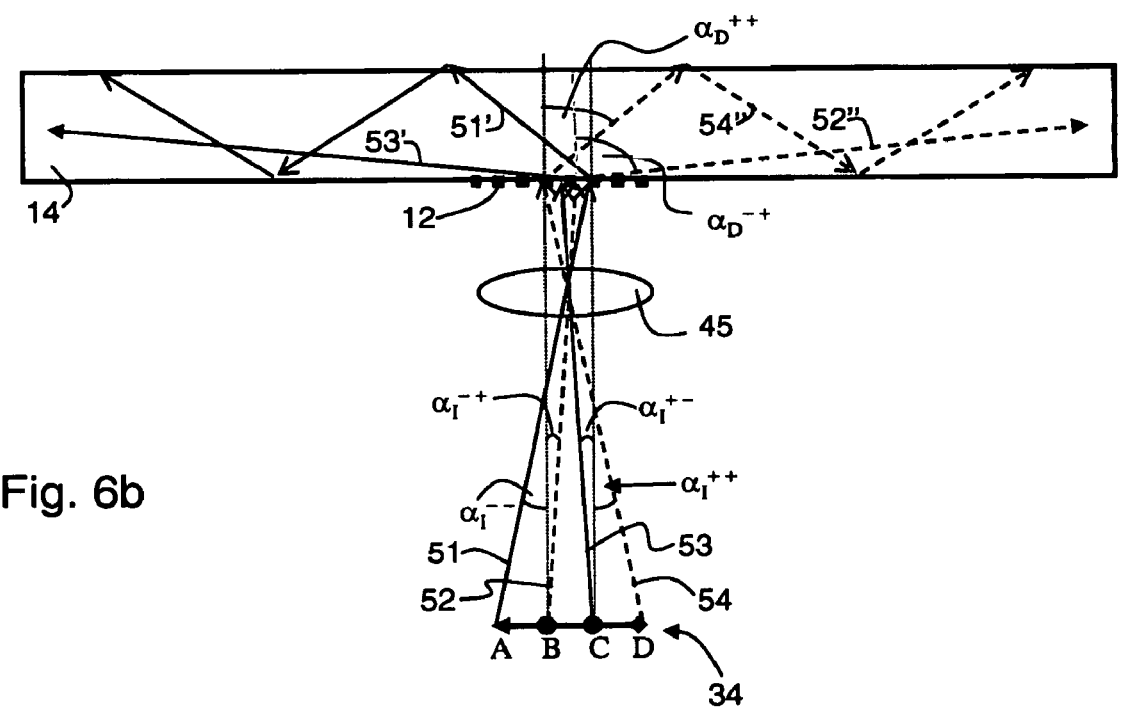

Reference is now made to FIGS. 6a-b which are schematic illustrations of wavefront propagation within substrate 14, according to preferred embodiments of the present invention. Shown in FIGS. 6a-b are four light rays, 51, 52, 53 and 54, respectively emitted from four points, A, B, C and D, of image 34. The incident angles, relative to the normal to light-transmissive substrate, of rays 51, 52, 53 and 54 are denoted $\alpha_I^{--}$, $\alpha_I^{-+}$, $\alpha_I^{+-}$ and $\alpha_I^{++}$, respectively. As will be appreciated by one of ordinary skill in the art, the first superscript index refer to the position of the respective ray relative to the center of the field-of-view, and the second superscript index refer to the position of the respective ray relative to the normal from which the angle is measured, according to the aforementioned sign convention.

It is to be understood that this sign convention cannot be considered as limiting, and that one ordinarily skilled in the art can easily practice the present invention employing an alternative convention.

Similar notations will be used below for the diffraction angles of the rays, with the subscript D replacing the subscript I. Denoting the superscript indices by a pair i, j, an incident angle is denoted generally as $\alpha_I^{ij}$, and a diffraction angle is denoted generally as $\alpha_D^{ij}$, where i j="--", "-+", "+-" or "--". The relation between each incident angle, $\alpha_I^{ij}$, and its respective diffraction angle, $\alpha_D^{ij}$, is given by Equation 2, above, with the replacements $\alpha_I \to \alpha_I^{ij}$, and $\alpha_D \to \alpha_D^{ij}$.

Points A and D represent the left end and the right end of image 34, and points B and C are located between points A and D. Thus, rays 51 and 53 are the leftmost and the rightmost light rays of a first asymmetric field-of-view, corresponding to a portion A-C of image 34, and rays 52 and 54 are the leftmost and the rightmost light rays of a second asymmetric field-of-view corresponding to a portion B-D of image 34. In angular notation, the first and second asymmetric field-of-view are, respectively, $[\alpha_I^{--}, \alpha_I^{+-}]$ and $[\alpha_I^{-+}, \alpha_I^{++}]$ (exclusive representations). Note that an overlap field-of-view between the two symmetric field-of-views is defined between rays 52 and 53, which overlap equals $[\alpha_I^{-+}, \alpha_I^{+-}]$ and corresponds to an overlap B-C between portions A-C and B-D of image 34.

In the configuration shown in FIGS. 6a-b, a lens 45 magnifies image 34 and collimates the wavefronts emanating therefrom. For example, light rays 51-54 pass through a center of lens 45, impinge on substrate 14 at angles $\alpha_I^{ij}$ and diffracted by input optical element 12 into substrate 14 at angles $\alpha_D^{ij}$. For the purpose of a better understanding of the illustrations in FIGS. 6a-b, only two of the four diffraction angles (to each side) are shown in each figure, where FIG. 6a shows the diffraction angles to the right of rays 51 and 53 (angles $\alpha_D^{+-}$ and $\alpha_D^{--}$), and FIG. 6b shows the diffraction angles to the right of rays 52 and 54 (angles $\alpha_D^{-+}$ and $\alpha_D^{++}$).

Each diffracted light ray experiences a total internal reflection upon impinging the inner surfaces of substrate 14 if $|\alpha_D^{ij}|$, the absolute value of the diffraction angle is larger than the critical angle, $\alpha_c$. Light rays with $|\alpha_D^{ij}|<\alpha_c$ do not experience a total internal reflection hence escape from substrate 14. Generally, because input optical element 12 diffracts the light both to the left and to the right, a light ray may, in principle, split into two secondary rays each propagating in an opposite direction within substrate 14, provided the diffraction angle of each of the two secondary rays is larger than $\alpha_c$. To ease the understanding of the illustrations in FIGS. 6a-b, secondary rays diffracting leftward and rightward are designated by a single and double prime, respectively.

Reference is now made to FIG. 6a showing a particular and preferred embodiment in which $|\alpha_D^{-+}|=|\alpha_D^{+-}|=\alpha_c$. Shown in FIG. 6a are rightward propagating rays 51" and 53", and leftward propagating rays 52' and 54'. Hence, in this embodiment, element 12 split all light rays between ray 51 and ray 52 into two secondary rays, a left secondary ray, impinging on the inner surface of substrate 14 at an angle which is smaller than $\alpha_c$, and a right secondary ray, impinging on the inner surface of substrate 14 at an angle which is larger than $\alpha_c$. Thus, light rays between ray 51 and ray 52 can only propagate rightward within substrate 14. Similarly, light rays between ray 53 and ray 54 can only propagate leftward. On the other hand, light rays between rays 52 and 53, corresponding to the overlap between the asymmetric field-of-views, propagate in both directions, because element 12 split each such ray into two secondary rays, both impinging the inner surface of substrate 14 at an angle larger than the critical angle, $\alpha_c$.

Thus, light rays of the asymmetrical field-of-view defined between rays 51 and 53 propagate within light-transmissive substrate 14 to thereby reach second output optical element 17 (not shown in FIG. 6a), and light rays of the asymmetrical field-of-view defined between rays 52 and 54 propagate within light-transmissive substrate 14 to thereby reach first output optical element 15 (not shown in FIG. 6a).

In another embodiment, illustrated in FIG. 6b, the light rays at the largest entry angle split into two secondary rays, both with a diffraction angle which is larger than $\alpha_c$, hence do not escape from substrate 14. However, whereas one secondary ray experience a few reflections within substrate 14, and thus successfully reaches its respective output optical element (not shown), the diffraction angle of the other secondary ray is too large for the secondary ray to impinge the other side of substrate 14, so as to properly propagate therein and reach its respective output optical element.

Specifically shown in FIG. 6b are original rays 51, 52, 53 and 54 and secondary rays 51', 52", 53' and 54". Ray 54 splits into two secondary rays, ray 54' (not shown) and ray 54" diffracting leftward and rightward, respectively. However, whereas rightward propagating ray 54" diffracted at an angle $\alpha_D^{++}$ experiences a few reflection within substrate 14 (see FIG. 6b), leftward propagating ray 54' either diffracts at an angle which is too large to successfully reach element 15, or evanesces.

Similarly, ray 52 splits into two secondary rays, 52' (not shown) and 52" diffracting leftward and rightward, respectively. For example, rightward propagating ray 52" diffracts at an angle $\alpha_D^{-+}>\alpha_c$. Both secondary rays diffract at an angle which is larger than $\alpha_c$, experience one or a few reflections within substrate 14 and reach output optical element 15 and 17 respectively (not shown). Supposing that $\alpha_D^{-+}$ is the largest angle for which the diffracted light ray will successfully reach the optical output element 17, all light rays emitted from portion A-B of the image do not reach element 17 and all light rays emitted from portion B-D successfully reach element 17. Similarly, if angle $\alpha_D^{+-}$ is the largest angle (in absolute value) for which the diffracted light ray will successfully reach optical output element 15, then all light rays emitted from portion C-D of the image do not reach element 15 and all light rays emitted from portion A-C successfully reach element 15.

Thus, light rays of the asymmetrical field-of-view defined between rays 51 and 53 propagate within light-transmissive substrate 14 to thereby reach output optical element 15, and light rays of the asymmetrical field-of-view defined between rays 52 and 54 propagate within light-transmissive substrate 14 to thereby reach output optical element 17.

Any of the above embodiments can be successfully implemented by a judicious design of the monocular devices, and, more specifically the input/output optical elements and the light-transmissive substrate.

For example, as stated, the input and output optical elements can be linear diffraction gratings having identical periods and being in a parallel orientation. This embodiment is advantageous because it is angle-preserving. Specifically, the identical periods and parallelism of the linear gratings ensure that the relative orientation between light rays exiting the substrate is similar to their relative orientation before the impingement on the input optical element. Consequently, light rays emanating from a particular point of the overlap portion B-C of image 34, hence reaching both eyes, are parallel to each other. Thus, such light rays can be viewed by both eyes as arriving from the same angle in space. It will be appreciated that with such configuration viewing convergence is easily obtained without eye-strain or any other inconvenience to the viewer, unlike the prior art binocular devices in which relative positioning and/or relative alignment of the optical elements is necessary.

According to a preferred embodiment of the present invention the period, d, of the gratings and/or the refraction index, $n_S$, of the light-transmissive substrate can be selected so to provide, the two asymmetrical field-of-views, while ensuring a predetermined overlap therebetween. This can be achieved in more than one way.

Hence, in one embodiment, a ratio between the wavelength, $\lambda$, of the light and the period, d, is larger than or equal a unity:

$$\lambda/d \geq 1. \qquad \text{(EQ. 3)}$$

This embodiment can be used to provide an optical device operating according to the aforementioned principle in which there is no mixing between light rays of the non-overlapping portions of the field-of-view (see FIG. 6a).

In another embodiment, the ratio $\lambda/d$ is smaller than the refraction index, $n_S$, of the light-transmissive substrate. More specifically, d and $n_S$ can be selected to comply with the following inequality:

$$d > \lambda/(n_S p), \qquad \text{(EQ. 4)}$$

where p is a predetermined parameter which is smaller than 1.

The value of p is, preferably selected so as to ensure operation of the device according to the principle in which some mixing is allowed between light rays of the non-overlapping portions of the field-of-view, as further detailed hereinabove (see. FIG. 6b). This can be done for example, by setting $p = \sin(\alpha_D^{MAX})$, where $(\alpha_D^{MAX})$ is a maximal diffraction angle. Because there are generally no theoretical limitations on $\alpha_D^{MAX}$ (apart from a requirement that its absolute value is smaller than 90°), it may be selected according to any practical considerations, such as cost, availability or geometrical limitations which may be imposed by a certain miniaturization necessity. Hence, in one embodiment, further referred to herein as the "at least one hop" embodiment, $\alpha_D^{MAX}$ is selected so as to allow at least one reflection within a predetermined distance x which may vary from about 30 mm to about 80 mm.

For example, for a glass light-transmissive substrate, with an index of refraction of $n_S = 1.5$ and a thickness of 2 mm, a single total internal reflection event of a light having a wavelength of 465 nm within a distance x of 34 mm, corresponds to. $\alpha_D^{MAX} = 83.3°$.

In another embodiment further referred to herein as the "flat" embodiment, $\alpha_D^{MAX}$ is selected so as to reduce the number of reflection events within the light-transmissive substrate, e.g., by imposing a requirement that all the diffraction angles will be sufficiently small, say, below 80°.

In an additional embodiment, particularly applicable to those situations in the industry in which the refraction index of the light-transmissive substrate is already known (for example when device 20 is intended to operate synchronically with a given device which includes a specific light-transmissive substrate), Equation 4 may be inverted to obtain the value of p hence also the value of $\alpha_D^{MAX} = \sin^{-1} p$.

As stated, device 20 can transmit light having a plurality of wavelengths. According to a preferred embodiment of the present invention, for a multicolor image the gratings period is, preferably selected to comply with Equation 3, for the shortest wavelength, and with Equation 4, for the longest wavelength. Specifically:

$$\lambda_R/(n_S p) \leq d \leq \lambda_B, \qquad \text{(EQ. 5)}$$

where $\lambda_B$ and $\lambda_R$ are, respectively, the shortest and longest wavelengths of the multicolor spectrum. Note that it follows from Equation 5 that the index of refraction of the substrate should satisfy, under these conditions, $n_S p \geq \lambda_R/\lambda_B$.

The grating period can also be smaller than the sum $\lambda_B + \lambda_R$, for example:

$$d = \frac{\lambda_B + \lambda_R}{n_S \sin(\alpha_D^{MAX}) + n_A}. \qquad \text{(EQ. 6)}$$

According to another aspect of the present invention there is provided a method of transmitting light striking a light-transmissive substrate at a plurality of angles defining a field-of-view. The method comprises the following method steps in which in a first step the light is diffracted into the light-transmissive substrate in a manner such that different portions of the light, corresponding to different potions of the field-of-view, propagate in different directions within the substrate. In a second step of the method different portions of the light are complementarily diffracted out of the substrate, so as to substantially preserve the field-of-view.

The method can be used to transmit an image into a first eye and a second eye of a user. For example, the image can be first diffracted into the substrate, e.g., using an input optical element. Once trapped within the substrate, a first portion of the image (e.g., portion A-C) can be diffracted into the first eye of the user, and a second portion (e.g., portion B-D) can be diffracted into the second eye of the user. Optionally and preferably, the image portions can be diffracted using output optical element as further detailed hereinabove.

According to a preferred embodiment of the present invention the linear grating of each of the optical elements can be recorded by means of holographic techniques, by means of computer-generated masks and lithographic techniques, by direct writing techniques, by embossing, molding or etching or by any other procedure known in the art.

It should be understood that the light-transmissive substrate can be manufactured from any material which enables transmission of light therethrough, such as, but not limited to, glass or transparent polymer in the case of visible light. In any case, the index of refraction of the light-transmissive -substrate material should be larger than the index of refraction of air, or any other material bounding the light-transmissive substrates.

The preferred technical details of any embodiment of the invention are as follows. A thickness, h, of the light-transmissive substrate is between about 0.1 mm and about 5 mm, more preferably from about 2 mm to about 3 mm. For a multicolor image, h is preferably selected to allow simultaneous propagation of plurality of wavelengths, e.g.; $h > 10 \lambda_R$. The width/length of the light-transmissive substrate is preferably from about 10 mm to about 100 mm. A typical width/length of the input and output optical elements ranges for different optical applications such as the near eye display application described in U.S. Pat. No. 5,966,223 from about 5 mm to, about 20 mm. The preferred field-of-view is of at least 20 degrees, more preferably at least 30 degrees most preferably at least 40 degrees, in inclusive representation. The preferred spectrum of light, in a multi-color configuration, spans at least 100 nm. More specifically, the shortest wavelength, $\lambda_B$, generally corresponds to a blue light having a typical wavelength of between about 400 to about 500 nm, the longest wavelength, $\lambda_R$, generally corresponds to a red light having a typical wavelength of between about 600 to about 700 nm.

The present invention successfully addresses the shortcomings of the presently known configurations by providing a device, system, kit and method, capable of transmitting light at a wide field-of-view.

Thus, according to one aspect of the present invention there is provided an optical device for transmitting light striking the optical device at a plurality of angles defining a field-of-view, the optical device comprising a light-transmissive substrate formed with at least one input optical element and a plurality of output optical elements; the at least one input optical element being designed and constructed to diffract the light into the light-transmissive substrate in a manner such that different portions of the light, corresponding to different portions of the field-of-view, propagate in different directions within the light-transmissive substrate; and the plurality of output optical elements being designed and constructed to complementarily diffract the different portions of the light out of the light-transmissive substrate, thereby to substantially preserve the field-of-view.

According to further features in preferred embodiments of the invention described below, each of the at least one input optical element and the plurality of output optical elements is independently a linear diffraction grating.

According to still further features in the described preferred embodiments the plurality of output optical elements comprise a first output optical element diffracting a first portion of the field-of-view, and a second output optical element, diffracting a second portion of the field-of-view.

According to still further features in the described preferred embodiments the linear diffraction grating of the at least one input optical element, the linear diffraction grating of the first output optical element and the linear diffraction grating of the second output optical element are designed and constructed such that each light ray, being in the predetermined overlap, bifurcates within the device and exits the light-transmissive substrate in a form of two substantially parallel light rays.

According to still further features in the described preferred embodiments the light has a plurality of wavelengths defining a spectrum and further wherein different portions of the spectrum are complementarily diffracted out of the light-transmissive substrate by the plurality of output optical elements.

According to still further features in the described preferred embodiments the light has a plurality of wavelengths, respectively corresponding to a plurality of wavelength-dependent field-of-views, and further wherein the light-transmissive substrate, the at least one input optical element and the plurality of output optical elements are designed and constructed so as to maximize an overlap among the plurality of wavelength-dependent field-of-views.

According to still further features in the described preferred embodiments the plurality of output optical elements comprise a first output optical element and a second output optical element.

According to still further features in the described preferred embodiments the spectrum has a first portion and a second portion, each of the first and the second portions of the spectrum being diffracted out of the light-transmissive substrate by at least one of the first and the second output optical elements.

According to still further features in the described preferred embodiments the light-transmissive substrate, the at least one input optical element, the first output optical element and the second output optical element are designed and constructed such that when the first and the second portions of the spectrum strike the optical device at an angle within a first predetermined range, the first portion of the spectrum is diffracted out of the light-transmissive substrate by the first output optical element, and the second portion of the spectrum is diffracted out of the light-transmissive substrate by the second output optical element.

According to still further features in the described preferred embodiments the light-transmissive substrate, the at least one input optical element, the first output optical element and the second output optical element are designed and constructed such that: when the first portion of the spectrum strike the optical device at an angle within a first predetermined range, the first portion of the spectrum is diffracted out of the light-transmissive substrate by the first output optical element; and when the first portion of the spectrum strike the optical device at an angle within a second first predetermined range, the first portion of the spectrum is diffracted out of the light-transmissive substrate by the second output optical element.

According to another aspect of the present invention there is provided a binocular device for transmitting an image into a first eye and a second eye of a user, the binocular device comprising: an input optical element, formed in a light-transmissive substrate and capable of diffracting the image into the light-transmissive substrate; a first output optical element, formed in the light-transmissive substrate and capable of diffracting a first portion of the image out of the light-transmissive substrate into the first eye; and a second output optical element, formed in the light-transmissive substrate and capable of diffracting a second portion of the image out of the light-transmissive substrate into the second eye.

According to further features in preferred embodiments of the invention described below, the linear diffraction grating of the input optical element, the linear diffraction grating of the first output optical element and the linear diffraction grating of the second output optical element are designed and constructed such that each light ray, emitted by or reflected from the predetermined overlap, bifurcates within the device and exits the light-transmissive substrate in a form of two substantially parallel light rays, respectively propagating into the first and the second eyes.

According to still further features in the described preferred embodiments the image is a multicolor image characterized by a spectrum having a first portion and a second portion, each of the first and the second portions of the spectrum being diffracted out of the light-transmissive substrate by at least one of the first and the second output optical elements.

According to still further features in the described preferred embodiments the first portion of the spectrum of the first portion of the image is diffracted out of the light-transmissive substrate by the first output optical element, and the first portion of the spectrum of the second portion of the image is diffracted out of the light-transmissive substrate by the second output optical element.

According to still further features in the described preferred embodiments the first portion of the spectrum of the first portion of the image is diffracted out of the light-transmissive substrate by the first output optical element, and the second portion of the spectrum of the first portion of the image is diffracted out of the light-transmissive substrate by the second output optical element.

According to still further features in the described preferred embodiments the image is a multicolor image having a plurality of wavelengths, respectively corresponding to a plurality of wavelength-dependent portions of the image, and further wherein the light-transmissive substrate, the at least one input optical element and the plurality of output optical elements are designed and constructed so as to maximize an overlap among the plurality of wavelength-dependent portions of the image.

According to still further features in the described preferred embodiments the linear diffraction grating of the at least one input optical element, the linear diffraction grating of the first output optical element and the linear diffraction grating of the second output optical element, have substantially identical periods.

According to still further features in the described preferred embodiments the linear diffraction grating of the at least one input optical element, the linear diffraction grating of the first output optical element and the linear diffraction grating of the second output optical element, are substantially parallel.

According to yet another aspect of the present invention there is provided a binocular device for transmitting an image into a first eye and a second eye of a user, the binocular device comprising a first monocular device for providing the first eye with a first asymmetric field-of-view and a second monocular device for providing the second eye with a second asymmetric field-of-view, the first and second asymmetric field-of-views being mutually complementary to a combined field-of-view.

According to an additional aspect of the present invention there is provided a system for providing an image to a user, comprising a binocular device for transmitting an image into a first eye and a second eye of the user, and an image generating device for providing the binocular device with the image; wherein the binocular device comprises a first monocular device for providing the first eye with a first asymmetric field-of-view and a second monocular device for providing the second eye with a second asymmetric field-of-view, the first and second asymmetric field-of-views being mutually complementary to a combined field-of-view.

According to further features in preferred embodiments of the invention described below, the system further comprises a data source interface connectable to a data source and configured to receive a stream of imagery data from a data source and input the stream of imagery data into the image generating device.

According to still further features in the described preferred embodiments the system further comprises a controller for controlling at least one display characteristic of the image generating device.

According to still further features in the described preferred embodiments the controller is operable to transmit activation and deactivation signals to the data source.

According to still further features in the described preferred embodiments the controller is operable to select an operation mode of the data source.

According to still further features in the described preferred embodiments the system further comprises the data source.

According to still further features in the described preferred embodiments the system further comprises an audio unit, wherein the data source is configured to transmit audio data to the audio unit.

According to still further features in the described preferred embodiments the data source is selected from the group consisting of a television apparatus, a portable television device, a satellite receiver, a video cassette recorder, a digital versatile disc, digital moving picture player, digital camera, video graphic array card, personal digital assistant, cellular telephone, ultrasound imaging apparatus, ultrasound imaging apparatus, digital X-ray apparatus and magnetic resonance imaging apparatus.

According to still further features in the described preferred embodiments the imagery data is encoded and further wherein the system comprises a decoder for decoding the imagery data into a data format recognizable by the image generating device.

According to still further features in the described preferred embodiments the imagery data is compressed and further wherein the system comprises a decompression unit for decompressing the imagery data.

According to still further features in the described preferred embodiments the system further comprises a wireless communication transmitter for transmitting the stream of imagery data, wherein the data source interface comprises a wireless communication receiver configured for receiving the stream of imagery data from the wireless communication transmitter.

According to still further features in the described preferred embodiments the system further comprises a wearable device being connected to the binocular device.

According to still further features in the described preferred embodiments the system further comprising a vision correction device, integrated with or mounted on the binocular device.

According to still an additional aspect of the present invention there is provided a communication kit, comprising: a communication device, for providing a stream of imagery data; an image generating device for receiving the stream of imagery data and generating an image therefrom; and a binocular device for transmitting the image into a first eye and a second eye of the user; wherein the binocular device comprises a first monocular device for providing the first eye with a first asymmetric field-of-view and a second monocular device for providing the second eye with a second asymmetric field-of-view, the first and second asymmetric field-of-views being mutually complementary to a combined field-of-view.

According to further features in preferred embodiments of the invention described below, the kit is portable.

According to still further features in the described preferred embodiments the communication device is selected from the group consisting of a cellular telephone, a personal digital assistant and a portable computer.

According to still further features in the described preferred embodiments the kit further comprises a controller for controlling at least one display characteristic of the image generating device.

According to still further features in the described preferred embodiments the controller is operable to transmit activation and deactivation signals to the communication device.

According to still further features in the described preferred embodiments the controller is operable to select an operation mode of the communication device.

According to still further features in the described preferred embodiments the kit further comprises an audio unit, wherein the communication device is configured to transmit audio data to the audio unit.

According to still further features in the described preferred embodiments the imagery data is encoded and further wherein the kit comprises a decoder for decoding the imagery data into a data format recognizable by the image generating device.

According to still further features in the described preferred embodiments the imagery data is compressed and further wherein the kit comprises a decompression unit for decompressing the imagery data.

According to still further features in the described preferred embodiments the kit further comprises a wireless communication transmitter for transmitting the stream of imagery data from the communication device, and a wireless communication receiver for receiving the stream of imagery data.

According to still further features in the described preferred embodiments the kit further comprises a wearable device being connected to the binocular device.

According to still further features in the described preferred embodiments the kit further comprising a vision correction device, integrated with or mounted on the binocular device.

According to further features in preferred embodiments of the invention described below, each of the first and the second monocular devices is defined by a light-transmissive substrate, an input optical element and an output optical element, such that the first and the second monocular devices share the light-transmissive substrate and the input optical element.

According to still further features in the described preferred embodiments the first and the second monocular devices are designed and constructed so as to provide a predetermined overlap between the first asymmetric field-of-view and the second asymmetric field-of-view.

According to still further features in the described preferred embodiments the first and the second monocular devices are designed and constructed such that each light ray, being in the predetermined overlap, bifurcates within the binocular device and exits through the first and the second monocular devices in a form of two substantially parallel light rays, respectively propagating into the first and the second eyes.

According to still further features in the described preferred embodiments the image is a multicolor image characterized by a spectrum having a first portion and a second portion, and further wherein the first and the second monocular devices are designed and constructed such each eye is provided with at least one of the first and the second portions of the spectrum.

According to still further features in the described preferred embodiments the first and the second monocular devices are designed and constructed such that when the first and the second portions of the spectrum strike the binocular device at an angle within a first predetermined range, the first eye is provided with the first portion of the spectrum, and the second eye is provided with the second portion of the spectrum.

According to still further features in the described preferred embodiments the first and the second monocular devices are designed and constructed such that: when the first portion of the spectrum strike the binocular device at an angle within a first predetermined range, the first eye is provided with the first portion of the spectrum; and when the first portion of the spectrum strike the optical device at an angle within a second first predetermined range, the second eye is provided with the first portion of the spectrum.

According to still further features in the described preferred embodiments the image is a multicolor image having a plurality of wavelengths, each corresponding to a wavelength-dependent combined field-of-view, and further wherein the first and the second monocular devices are designed and constructed so as to maximize an overlap between at least two wavelength-dependent combined field-of-views.

According to still further features in the described preferred embodiments the device further comprises a collimator for collimating the light.

According to still further features in the described preferred embodiments the collimator comprises a converging lens.

According to still further features in the described preferred embodiments the converging lens is a spherical converging lens.

According to still further features in the described preferred embodiments the converging lens is a non-spherical converging lens.

According to still further features in the described preferred embodiments the collimator comprises an arrangement of lenses.

According to still further features in the described preferred embodiments the collimator comprises a diffractive optical element.

According to a further aspect of the present invention there is provided a method of transmitting light striking light-transmissive substrate at a plurality of angles defining a field-of-view, the method comprising: (a) diffracting the light into the light-transmissive substrate in a manner such that different portions of the light, corresponding to different portions of the field-of-view, propagate in different directions within the light-transmissive substrate; and (b) complementarily diffracting the different portions of the light out of the light-transmissive substrate, so as to substantially preserve the field-of-view.

According to further features in preferred embodiments of the invention described below, steps (a) and (b) are executed so as to provide a predetermined overlap between the first and the second portions of the field-of-view.

According to still further features in the described preferred embodiments step (a) comprises bifurcating each light ray, being in the predetermined overlap, into a bifurcated light ray, and step (b) comprises diffracting the bifurcated light ray out of the light-transmissive substrate in a form of two substantially parallel light rays.

According to still further features in the described preferred embodiments the light has a plurality of wavelengths, respectively corresponding to a plurality of wavelength-dependent field-of-views, and further wherein steps (a) and (b) are executed so as to maximize an overlap among the plurality of wavelength-dependent field-of-views.

According to still further features in the described preferred embodiments the light has a plurality of wavelengths defining a spectrum having a first portion and a second portion, each of the first and the second portions of the spectrum being diffracted out of the light-transmissive substrate by at least one linear diffraction grating.

According to still further features in the described preferred embodiments step (b) comprises: if both the first and the second portions of the spectrum strike the light-transmissive substrate at an angle within a first predetermined range, then diffracting the first portion of the spectrum by a first linear diffraction grating and the second portion of the spectrum by a second linear diffraction grating.

According to still further features in the described preferred embodiments step (b) comprises: if the first portion of the spectrum strikes the light-transmissive substrate at an angle within a first predetermined range, then diffracting the first portion of the spectrum by a first linear diffraction grating; and if the first portion of the spectrum strikes the light-transmissive substrate at an angle within a second predetermined range, then diffracting the first portion of the spectrum by a second linear diffraction grating.

According to still further features in the described preferred embodiments the method further comprises producing the light using a light source.

According to still further features in the described preferred embodiments the method further comprises producing an image to be constituted by the light using image generating device.

According to still further features in the described preferred embodiments the method further comprises collimating the light using a collimator.

According to still further features in the described preferred embodiments a ratio between a wavelength of the light and a period characterizing the linear diffraction gratings is larger than or equal a unity.

According to still further features in the described preferred embodiments a period characterizing the linear diffraction gratings is larger than $\lambda_R/(n_s p)$ and smaller than $\lambda_B$, the $n_s$ being a refraction index of the light-transmissive substrate, the p being a predetermined parameter, the $\lambda_R$ being a longest wavelength of the spectrum and the $\lambda_B$ being a shortest wavelength of the spectrum.

According to still further features in the described preferred embodiments a ratio between a wavelength of the light and a period characterizing the linear diffraction gratings is smaller than a refraction index of the light-transmissive substrate.

According to still another aspect of the present invention there is provided a method of transmitting an image into a first eye and a second eye of a user, the method comprising: (a) diffracting the image into a light-transmissive substrate; (b) diffracting a first portion of the image out of the light-transmissive substrate into the first eye; and (c) diffracting a second portion of the image out of the light-transmissive substrate into the second eye.

According to further features in preferred embodiments of the invention described below, steps (a)-(c) are each independently effected by a linear diffraction grating.

According to still further features in the described preferred embodiments steps (a)-(c) are executed so as to provide a predetermined overlap between the first and the second portions of the image.

According to still further features in the described preferred embodiments step (a) comprises bifurcating each light ray, emitted by or reflected from the predetermined overlap, into a bifurcated light ray, and steps (b) and (c) respectively comprises diffracting the bifurcated light ray out of the light-transmissive substrate in a form of two substantially parallel light rays propagating into the first and the second eyes.

According to still further features in the described preferred embodiments step (b) comprises diffracting the first portion of the spectrum into the first eye, and step (c) comprises diffracting the first portion of the spectrum into the second eye.

According to still further features in the described preferred embodiments step (b) further comprises diffracting the second portion of the spectrum into the second eye.

According to still further features in the described preferred embodiments the image is a multicolor image having a plurality of wavelengths, respectively corresponding to a plurality of wavelength-dependent portions of the image, and further wherein steps (a)-(c) are executed so as to maximize an overlap among the plurality of wavelength-dependent portions of the image.

According to yet another aspect of the present invention there is provided a method of transmitting an image into a first eye and a second eye of a user, the method comprising: (a) transmitting a first asymmetric field-of-view to the first eye with; and (b) transmitting a second asymmetric field-of-view to the second eye; the first and second asymmetric field-of-views being mutually complementary to a combined field-of-view.

According to further features in preferred embodiments of the invention described below, steps (a) and (b) are each independently effected by a linear diffraction grating.

According to still further features in the described preferred embodiments steps (a) and (b) are executed so as to provide a predetermined overlap between the first and the second asymmetric field-of-views.

According to still further features in the described preferred embodiments the method further comprises bifurcating each light ray, being in the predetermined overlap, into a bifurcated light ray, wherein steps (b) and (c) respectively comprises transmitting the bifurcated light ray into the first and the second eyes in a form of two substantially parallel light rays.

According to still further features in the described preferred embodiments step (a) comprises transmitting the first portion of the spectrum into the first eye, and step (b) comprises diffracting the first portion of the spectrum into the second eye.

According to still further features in the described preferred embodiments step (a) further comprises transmitting the second portion of the spectrum into the second eye.

According to still further features in the described preferred embodiments the image is a multicolor image having a plurality of wavelengths, each corresponding to a wavelength-dependent combined field-of-view, and further wherein steps (a) and (b) are executed so as to maximize an overlap between at least two wavelength-dependent combined field-of-views.

According to still further features in the described preferred embodiments the method further comprises producing the image using an image generating device.

According to still further features in the described preferred embodiments the method further comprises collimating light constituting the image using a collimator.

According to yet a further aspect of the present invention there is provided a method of viewing an image, comprising (a) generating an image using an image generating device; and (b) viewing the image through a binocular device using a first eye and a second eye, in a manner such that a first asymmetric field-of-view of the image is viewed by the first eye, and a second asymmetric field-of-view of the image is viewed by the second eye, wherein the first and second asymmetric field-of-views are mutually complementary to a combined field-of-view.

According to further features in preferred embodiments of the invention described below, the image generating device is an analog image generating device.

According to still further features in the described preferred embodiments the analog image generating device comprises a light source and at least one image carrier selected from the group consisting of a miniature slide, a reflective microfilm, a transparent microfilm and a hologram.

According to still further features in the described preferred embodiments the analog image generating device comprises a miniature cathode ray tube.

According to still further features in the described preferred embodiments the image generating device is a digital image generating device.

According to still further features in the described preferred embodiments the digital image generating device comprises at least one miniature display selected from the group consisting of a reflective miniature liquid crystal display, a transparent miniature liquid crystal display, an OLED, a digital light processor unit and a plasma display. According to still further features in the described preferred embodiments the digital image generating device further comprises a light source.

According to still further features in the described preferred embodiments the method further comprises controlling at least one display characteristic of the image generating device.

According to still further features in the described preferred embodiments the method further comprises transmitting a stream of imagery data from a data source and inputting the stream of imagery data into the image generating device.

According to still further features in the described preferred embodiments the method further comprises transmitting activating and deactivating signals to the data source.

According to still further features in the described preferred embodiments the method further comprises selecting operation mode of the data source.

According to still further features in the described preferred embodiments the stream of imagery data comprises at least one data type selected from the group consisting of video and graphics.

According to still further features in the described preferred embodiments the method further comprises transmitting audio data to an audio unit and generating audio using the audio unit.

According to still further features in the described preferred embodiments the data source is selected from the group consisting of a television apparatus, a satellite receiver, a video cassette recorder, a digital versatile disc, digital moving picture player, digital camera, video graphic array card, personal digital assistant, cellular telephone, ultrasound imaging apparatus, digital X-ray apparatus and magnetic resonance imaging apparatus.

According to still further features in the described preferred embodiments the method further comprises encoding the imagery data prior to the transmission of the imagery data, and decoding the imagery data into a data format recognizable by the image generating device prior to the inputting of the imagery data into the image generating device.

According to still further features in the described preferred embodiments the method further comprises compressing the imagery data prior to the transmission of the imagery data, and decompressing the imagery data prior to the inputting of the imagery data into the image generating device.

According to still further features in the described preferred embodiments the transmission of the stream of imagery data is by a wireless communication transmitter.

According to still further features in the described preferred embodiments the method further comprises wearing a wearable device being connected to the binocular device.

According to still further features in the described preferred embodiments the combined field-of-view is symmetric.

According to still further features in the described preferred embodiments the combined field-of-view is asymmetric.

According to still further features in the described preferred embodiments the combined field-of-view is of at least 20 degrees.

According to still further features in the described preferred embodiments the combined field-of-view is of at least 30 degrees.

According to still further features in the described preferred embodiments the combined field-of-view is of at least 40 degrees.

According to still further features in the described preferred embodiments the propagation of the light within the light-transmissive substrate is via total internal reflection which is characterized by a predetermined maximal diffraction angle.

According to still further features in the described preferred embodiments the predetermined maximal diffraction angle equals about 80 degrees with respect to a perpendicular orientation to the light-transmissive substrate.

According to still further features in the described preferred embodiments the predetermined maximal diffraction angle is selected so as to allow at least one reflection within a predetermined distance.

According to still further features in the described preferred embodiments the predetermined distance is from about 30 mm to about 80 mm.

According to still further features in the described preferred embodiments a thickness of the light-transmissive substrate is selected so as to allow simultaneous propagation of the plurality of wavelengths.

According to still further features in the described preferred embodiments $\lambda_B$ is between about 400 to about 500 nm.

According to still further features in the described preferred embodiments $\lambda_R$ is between about 600 to about 700 nm.

According to still further features in the described preferred embodiments a thickness of the light-transmissive substrate is from about 0.1 mm to about 5 mm.

According to still further features in the described preferred embodiments a thickness of the light-transmissive substrate is selected so as to allow simultaneous propagation of a plurality of wavelengths.

According to still further features in the described preferred embodiments a thickness of the light-transmissive substrate is larger than $10\lambda_R$.

According to still further features in the described preferred embodiments the light-transmissive substrate is selected from the group consisting of glass and a transparent polymer.

According to still further features in the described preferred embodiments the linear diffraction grating is selected from the group consisting of reflection linear diffraction grating and transmission linear diffraction grating.

According to still further features in the described preferred embodiments the linear diffraction grating is recorded by a procedure selected from a group consisting of holography, computer-generated masks, lithography, embossing, molding, etching and direct writing.

Additional objects, advantages and novel features of the present invention will become apparent to one ordinarily skilled in the art upon examination of the following examples, which are not intended to be limiting. Additionally, each of the various embodiments and aspects of the present invention as delineated hereinabove and as claimed in the claims section below finds experimental support in the following examples.

EXAMPLES

Reference is now made to the following examples, which together with the above descriptions illustrate the invention in a non limiting fashion.

Example 1

Monochromatic Configuration for Blue Light

This example demonstrate the attainable field-of-view when Equation 3 is employed for a wavelength $\lambda=465$ nm (blue light), and indices of refraction $n_S=1.5$ for the light-transmissive substrate and $n_A=1.0$ for air, corresponding to a the critical angle is 41.8°.

For a grating period d=430 mn ($\lambda/d>1$, see Equation 3), the maximal (negative by sign) angle at which total internal reflection can be occur is 4.67°. In the notation of FIG. 6a, $\alpha_I^{+-}=-4.67°$ (see ray 53). However, the positive incidence angle (see ray 51 of FIG. 6a) can be as large as $\alpha_I^{--}=23.32°$, in which case the diffraction angle is about 80°, which comply with the total internal reflection condition. Thus, in this configuration, each of the attainable asymmetric field-of-views is of $|\alpha_I^{++}|+\alpha_I^{--}\approx 28°$, resulting in a symmetric combined field-of-view of $2\times\alpha_I^{--}\approx 47°$.

Example 2

Monochromatic Configuration for Red Light

This example demonstrate the attainable field-of-view when Equation 4 is employed for a wavelength $\lambda=620$ nm (red light) and the refraction indices of Example 1, corresponding to the same critical angle ($\alpha_c=41.8°$).

Imposing the "flat" requirement and a maximal diffraction angle of 80°, one can calculate that for $\lambda=620$ nm the, grating period of Example 1 d=430 nm complies with Equation 4.

The maximal (positive by sign) angle at which total internal reflection can occur is 2.03°. In the notation of FIG. 6b, $\alpha_I^{-+}=+2.03°$ (see ray 52). The negative incidence angle (see ray 54 of FIG. 6b) is limited by the requirement $|\alpha_D^{++}|<\alpha_c$, which corresponds to $\alpha_I^{++}=-26.22°$. Thus, in this configuration, each of the attainable asymmetric field-of-views is of about 28°, resulting in a symmetric combined field-of-view of about 52°.

Example 3

Multicolor Configuration

This example demonstrate the attainable field-of-view when Equation 6 is employed for a spectrum in which the shortest wavelength is $\lambda_B=465$ nm (blue light) and the longest wavelength is $\lambda_R=620$ nm (red light). The refraction indices, the critical angle and the maximal diffraction angle are the same as in Example 2.

Using Equation 6, one obtains d=438 nm. Further, using Equation 2 one can calculate the asymmetric field-of-views of the blue and red lights.

Hence for the blue light the first asymmetric field-of-view is [−3.54°, 24.56°], the second asymmetric field-of-view is [−24.56°, 3.54°], resulting in a combined field-of-view of about 49°.

For the red light, the calculation yield an opposite situation in which the first asymmetric field-of-view is [−24.56°, 3.54°], and the second asymmetric field-of-view is [−3.54°, 24.56°], still resulting in a combined field-of-view of about 49°.

If a third, intermediate wavelength is present, say 525 nm (green light), then the first green asymmetric field-of-view is [−11.46°, 16.180°], and the second green asymmetric field-of-view is [−16.18°, 11.46°], resulting in a symmetric combined field-of-view of about 32°. Thus, the overlap between the individual wavelength-dependent field-of-views is of 32°. It will be appreciated that selecting a different period for the gratings may result in a larger overlapping field of view.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope, of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A system for providing an image to a user, comprising a binocular device for transmitting an image into a first eye and a second eye of the user, and an image generating device for providing said binocular device with said image;

wherein said binocular device comprises a first monocular device for providing the first eye with a first asymmetric field-of-view associated with a first range of incident angles corresponding to a first portion of said image and a second monocular device for providing the second eye with a second asymmetric field-of-view associated with a second range of incident angles corresponding to a second portion of said image and being different from said first asymmetric field-of-view, said first and second asymmetric field-of-views being mutually complementary to a combined field-of-view which is wider than each of said first and said second asymmetric field-of-views.

2. The system of claim 1, wherein said image generating device is an analog image generating device.

3. The system of claim 2, wherein said analog image generating device comprises a light source and at least one image carrier selected from the group consisting of a miniature slide, a reflective microfilm, a transparent microfilm and a hologram.

4. The system of claim 2, wherein said analog image generating device comprises a miniature cathode ray tube.

5. The system of claim 1, wherein said image generating device is a digital image generating device.

6. The system of claim 5, wherein said digital image generating device comprises at least one miniature display selected from the group consisting of a reflective miniature liquid crystal display, an organic light emitting diode array (OLED), a digital light processor unit, a transparent miniature liquid crystal display and a plasma display.

7. The system of claim 6, wherein said digital image generating device further comprises a light source.

8. The system of claim 1, further comprising a controller for controlling at least one display characteristic of said image generating device.

9. The system of claim 1, further comprising a data source interface connectable to a data source and configured to receive a stream of imagery data from a data source and input said stream of imagery data into said image generating device.

10. The system of claim 9, further comprising a controller for controlling at least one display characteristic of said image generating device.

11. The system of claim 10, wherein said controller is operable to transmit activation and deactivation signals to said data source.

12. The system of claim 10, wherein said controller is operable to select an operation mode of said data source.

13. The system of claim 9, further comprising said data source.

14. The system of claim 13, wherein said stream of imagery data comprises at least one data type selected from the group consisting of video and graphics.

15. The system of claim 14, further comprising an audio unit, wherein said data source is configured to transmit audio data to said audio unit.

16. The system of claim 13, wherein said data source is selected from the group consisting of a television apparatus, a portable television device, a satellite receiver, a video cassette recorder, a digital versatile disc, a digital moving picture player, a digital camera, a video graphic array card, a personal digital assistant, a cellular telephone, an ultrasound imaging apparatus, a digital X-ray apparatus and a magnetic resonance imaging apparatus.

17. The system of claim 13, wherein said imagery data is encoded and further wherein the system comprises a decoder for decoding said imagery data into a data format recognizable by said image generating device.

18. The system of claim 13, wherein said imagery data is compressed and further wherein the system comprises a decompression unit for decompressing said imagery data.

19. The system of claim 13, further comprising a wireless communication transmitter for transmitting said stream of imagery data, wherein said data source interface comprises a wireless communication receiver configured for receiving said stream of imagery data from said wireless communication transmitter.

20. The system of claim 1, further comprising a wearable device being connected to said binocular device.

21. The system of claim 1, further comprising a vision correction device, integrated with or mounted on said binocular device.

22. A communication kit, comprising:
a communication device, for providing a stream of imagery data;
an image generating device for receiving said stream of imagery data and generating an image therefrom; and
a binocular device for transmitting said image into a first eye and a second eye of the user;
wherein said binocular device comprises a first monocular device for providing the first eye with a first asymmetric field-of-view associated with a first range of incident angles corresponding to a first portion of said image and a second monocular device for providing the second eye with a second asymmetric field-of-view associated with a second range of incident angles corresponding to a second portion of said image and being different from said first asymmetric field-of-view, said first and second asymmetric field-of-views being mutually complementary to a combined field-of-view which is wider than each of said first and said second asymmetric field-of-views.

23. The kit of claim 22, being portable.

24. The kit of claim 23, wherein said communication device is selected from the group consisting of a cellular telephone, a personal digital assistant and a portable computer.

25. The kit of claim 22, wherein said image generating device is an analog image generating device.

26. The kit of claim 25, wherein said analog image generating device comprises a miniature cathode ray tube.

27. The kit of claim 22, wherein said image generating device is a digital image generating device.

28. The kit of claim 27, wherein said digital image generating device comprises at least one miniature display selected from the group consisting of a reflective miniature liquid crystal display, a transparent miniature liquid crystal display, an organic light emitting diode array (OLED), a digital light processor unit and a plasma display.

29. The kit of claim 28, wherein said digital image generating device further comprises a light source.

30. The kit of claim 22, further comprising a controller for controlling at least one display characteristic of said image generating device.

31. The kit of claim 30, wherein said controller is operable to transmit activation and deactivation signals to said communication device.

32. The kit of claim 30, wherein said controller is operable to select an operation mode of said communication device.

33. The kit of claim 22, wherein said stream of imagery data comprises at least one data type selected from the group consisting of video and graphics.

34. The kit of claim 33, further comprising an audio unit, wherein said communication device is configured to transmit audio data to said audio unit.

35. The kit of claim 22, wherein said imagery data is encoded and further wherein the kit comprises a decoder for decoding said imagery data into a data format recognizable by said image generating device.

36. The kit of claim 22, wherein said imagery data is compressed and further wherein the kit comprises a decompression unit for decompressing said imagery data.

37. The kit of claim 22, further comprising a wireless communication transmitter for transmitting said stream of imagery data from said communication device, and a wireless communication receiver for receiving said stream of imagery data.

38. The kit of claim 22, further comprising a wearable device being connected to said binocular device.

39. The system of claim 22, further comprising a vision correction device, integrated with or mounted on said binocular device.

40. A method of viewing an image, comprising at least the steps of:
(a) generating an image using an image generating device; and
(b) viewing said image through a binocular device using a first eye and a second eye, in a manner such that a first asymmetric field-of-view of associated with a first range of incident angles corresponding to first portion of said image is viewed by said first eye, and a second asymmetric field-of-view associated with a second range of incident angles corresponding to a second portion of said image and being different from said first asymmetric field-of-view, is viewed by said second eye, wherein said first and second asymmetric field-of-views are mutually complementary to a combined field-of-view which is wider than each of said first and said second asymmetric field-of-views.

41. The method of claim 40, wherein said image generating device is an analog image generating device.

42. The method of claim 41, wherein said analog image generating device comprises a light source and at least one image carrier selected from the group consisting of a miniature slide, a reflective microfilm, a transparent microfilm and a hologram.

43. The method of claim 41, wherein said analog image generating device comprises a miniature cathode ray tube.

44. The method of claim 40, wherein said image generating device is a digital image generating device.

45. The method of claim 44, wherein said digital image generating device comprises at least one miniature display selected from the group consisting of a reflective miniature liquid crystal display, a transparent miniature liquid crystal display, an organic light emitting diode array (OLED), a digital light processor unit and a plasma display.

46. The method of claim 45, wherein said digital image generating device further comprises a light source.

47. The method of claim 40, further comprising the step of controlling at least one display characteristic of said image generating device.

48. The method of claim 40, further comprising the step of transmitting a stream of imagery data from a data source and inputting said stream of imagery data into said image generating device.

49. The method of claim 48, further comprising the step of transmitting activating and deactivating signals to said data source.

50. The method of claim 48, further comprising the step of selecting operation mode of said data source.

51. The method of claim 48, wherein said stream of imagery data comprises at least one data type selected from the group consisting of video and graphics.

52. The method of claim 51, further comprising the step of transmitting audio data to an audio unit and generating audio using said audio unit.

53. The method of claim 48, wherein said data source is selected from the group consisting of a television apparatus, a satellite receiver, a video cassette recorder, a digital versatile disc, a digital moving picture player, a digital camera, a video graphic array card, a personal digital assistant, a cellular telephone, an ultrasound imaging apparatus, a digital X-ray apparatus and a magnetic resonance imaging apparatus.

54. The method of claim 48, further comprising the step of encoding said imagery data prior to said transmission of said imagery data, and decoding said imagery data into a data format recognizable by said image generating device prior to said inputting of said imagery data into said image generating device.

55. The method of claim 48, further comprising the step of compressing said imagery data prior to said transmission of said imagery data, and decompressing said imagery data prior to said inputting of said imagery data into said image generating device.

56. The method of claim 48, wherein said transmission of said stream of imagery data is by a wireless communication transmitter.

57. The method of claim 40, further comprising the step of wearing a wearable device being connected to said binocular device.

* * * * *